(12) United States Patent
Stephan et al.

(10) Patent No.: US 8,737,573 B2
(45) Date of Patent: May 27, 2014

(54) SYSTEMS, METHODS, AND DEVICES FOR TESTING COMMUNICATION LINES

(75) Inventors: Roy Stephan, Mclean, VA (US); Steve Anderson, Herndon, VA (US); Greg Eoyang, Rockville, MD (US); Tim Lannan, Cape Canaveral, FL (US)

(73) Assignee: Intelligent Decisions, Inc., Ashburn, VA (US)

(*) Notice: Subject to any disclaimer, the term of this patent is extended or adjusted under 35 U.S.C. 154(b) by 34 days.

(21) Appl. No.: 13/467,510

(22) Filed: May 9, 2012

(65) Prior Publication Data
US 2013/0121479 A1    May 16, 2013

Related U.S. Application Data

(60) Provisional application No. 61/484,028, filed on May 9, 2011.

(51) Int. Cl.
H04M 1/24 (2006.01)
H04M 3/08 (2006.01)
H04M 3/22 (2006.01)

(52) U.S. Cl.
USPC ........... 379/22; 379/1.01; 379/22.02; 379/24; 379/27.03

(58) Field of Classification Search
USPC ........ 379/1.01, 1.03, 9.02, 9.04, 9.06, 12, 21, 379/22, 22.01, 22.07, 22.08, 23, 24, 27.01, 379/27.07, 27.08, 29.02, 29.1, 22.02, 27.03
See application file for complete search history.

(56) References Cited

U.S. PATENT DOCUMENTS

| | | | |
|---|---|---|---|
| 3,965,418 A | | 6/1976 | Bauer |
| 4,301,536 A | | 11/1981 | Favin |
| 4,768,203 A | | 8/1988 | Ingle |
| 5,121,342 A | | 6/1992 | Szymborski |
| 5,473,666 A | | 12/1995 | Szczebak, Jr. et al. |
| 5,475,315 A | * | 12/1995 | Cabot ........................... 324/628 |
| 5,533,133 A | * | 7/1996 | Lamkin et al. ............... 381/94.5 |
| 5,559,854 A | | 9/1996 | Suzuki |
| 5,640,490 A | * | 6/1997 | Hansen et al. ................ 704/254 |
| 5,649,304 A | * | 7/1997 | Cabot ........................ 455/67.14 |
| 5,987,320 A | | 11/1999 | Bobick |
| 6,128,510 A | | 10/2000 | Beukema |

(Continued)

OTHER PUBLICATIONS

Smith, S. W., The Scientist and Engineer's Guide to Digital Signal Processing, 1997, pp. 34-86, California Technical Publishing, San Diego, CA.

*Primary Examiner* — Binh Tieu
(74) *Attorney, Agent, or Firm* — Mark S. Leonardo; Brown Rudnick LLP

(57) ABSTRACT

The invention generally relates to systems, devices, and methods for testing communication lines. In certain aspects, the invention provides systems and devices that include a digital/analog converter configured to operate with a computer processor and memory to send or receive an analog signal over a communication line that includes a plurality of signals having known frequencies. Inbound receiving sub-systems or devices sample the analog signal and measure a quality of the sampled, digital signal to evaluate the communication line. The key differentiator is the recognition that the human mouth and ear are intrinsically analog without encryption. By locating the test device as close to the user as possible, this system incorporates testing of complex communication streams including numerous variables and transforms (e.g. encryption, Analog to digital, Voice over IP, packet switching, ATM, SONET). Ultimately, it provides a simple interface to convert qualitative analysis to quantitative (numerical) analysis.

16 Claims, 20 Drawing Sheets

(56) References Cited

U.S. PATENT DOCUMENTS

| | | |
|---|---|---|
| 6,240,130 B1 | 5/2001 | Burns |
| 6,442,173 B1 * | 8/2002 | Barsoum et al. ............. 370/445 |
| 6,445,777 B1 * | 9/2002 | Clark ........................ 379/88.13 |
| 6,459,256 B1 | 10/2002 | Pickerd |
| 6,606,372 B2 | 8/2003 | Yi et al. |
| 6,677,888 B2 | 1/2004 | Roy |
| 6,683,949 B1 * | 1/2004 | Stelman ................... 379/387.01 |
| 6,701,269 B1 | 3/2004 | Jungerman |
| 6,775,240 B1 * | 8/2004 | Zhang et al. ................. 370/251 |
| 6,839,759 B2 | 1/2005 | Larson |
| 7,151,819 B2 | 12/2006 | Zellner et al. |
| 7,188,180 B2 | 3/2007 | Larson |
| 7,235,979 B2 | 6/2007 | Vitanza et al. |
| 7,339,364 B2 | 3/2008 | Kam |
| 7,460,983 B2 | 12/2008 | Pickerd |
| 7,529,347 B2 | 5/2009 | Warner et al. |
| 7,720,202 B1 | 5/2010 | Bachorik et al. |
| 2001/0038674 A1 | 11/2001 | Trans |
| 2002/0051463 A1 | 5/2002 | Higuchi |
| 2003/0034767 A1 | 2/2003 | Lipscomb |
| 2003/0219086 A1 | 11/2003 | LeCheminant |
| 2004/0027138 A1 | 2/2004 | Pickerd |
| 2004/0161028 A1 | 8/2004 | Roberts |
| 2005/0058122 A1 | 3/2005 | Anspach |
| 2006/0166624 A1 * | 7/2006 | Van Vugt ................... 455/67.11 |
| 2007/0042774 A1 | 2/2007 | Alcorn |
| 2007/0072590 A1 | 3/2007 | Levitan |
| 2007/0111670 A1 | 5/2007 | Compagne |
| 2007/0177578 A1 | 8/2007 | Anspach |
| 2009/0168972 A1 * | 7/2009 | Cioffi et al. ................. 379/1.04 |
| 2009/0187976 A1 | 7/2009 | Perroud |
| 2009/0227223 A1 * | 9/2009 | Jenkins ...................... 455/404.1 |
| 2009/0282469 A1 | 11/2009 | Lynch |
| 2010/0052653 A1 | 3/2010 | LeBrun |
| 2011/0099371 A1 | 4/2011 | Roy |
| 2011/0135093 A1 | 6/2011 | Radatti |
| 2011/0267036 A1 | 11/2011 | Kharrati |
| 2012/0307980 A1 * | 12/2012 | Krishnaswany ................. 379/3 |

* cited by examiner

FIG.5

Comm Test Extended

Mission Number: _____  Mission Date: 2/23/2011 ▽  Mission Start Time: ____  Mission End Time: ____  Platform: ____  ▽ Platform #: ____

Mission Notes: _____

Platform Configuration:  STE #: ____  STE Software Ver: ____  Receiver #: ____  Transmitter #: ____  Power (W): ____  Antenna #: ____

GEP / UHF Information: GEP: ____ ▽  RF Channel: ____  NCM Config: ____ ▽  CCMux: ____ ▽  CCSD: ____

Call Information: Call #: 1  Call Type: ____ ▽  Phone # Dialed: ____  Operator: ____  Weather: ____

Note: Call number will be auto-incremented during entry

Platform Location: Latitude: ____  Longitude: ____  Heading: ____  Altitude (ft): ____  Altitude: ____

Note: Location details should be recorded for each call

Event Information: Log Date: 2/23/2011 ▽  Start Time: ____  End Time: ____  Duration: ____  Secure Mode: ____  Who Went Secure: ____ ▽

Event Result: ____ ▽  Subjective Quality: ____  Notes: ____

Connection: ○ Inbound   ○ Outbound

[Generate Tone]  [Record Tone]  [Reset Test Counter]

Note: Separate events for Clear Mode, SCIP Low, SCIP Normal should be recorded during each call

[Open]  [Save]   Test Counter: 1   |◁ ◁ 1 of 1 ▷ ▷|

Status

FIG. 8

Log Analysis Report

| Testers Name | Local Location | Remote Location | Connection | STE Mode | Successful Connection | Subjective Line Quality | Special Config / Settings | Additional Comment |
|---|---|---|---|---|---|---|---|---|
| Steve Anderson | A2 | B1 | Inbound | Clear Mode | Y | 00 | | |
| Steve Anderson | A2 | B1 | Outbound | SCIP Normal | Y | 00 | | |
| Steve Anderson | A2 | B1 | Outbound | Clear Mode | N | 00 | | |
| Bill Anderson | A2 | B1 | Outbound | Clear Mode | Y | 00 | | |
| Steve Anderson | A2 | B1 | | | | | | |
| Steve Anderson | A2 | B1 | Outbound | SCIP Low | Y | 00 | | |
| John Anderson | A2 | B1 | Inbound | SCIP Low | Y | 00 | | |
| Steve Anderson | A1 | A2 | Outbound | Clear Mode | Y | 55 | Test1 | Test1Test1Test1Tes |
| Steve Anderson | A1 | A2 | Outbound | SCIP Normal | Y | 55 | Test2 | Test1Test1Test1Tes |
| Steve Anderson | A1 | A2 | Outbound | SCIP Low | Y | 55 | Test3 | Test1Test1Test1Tes |
| Steve Anderson | A1 | A2 | Outbound | Clear Mode | Y | 55 | Test4 | Test1Test1Test1Tes |
| Steve Anderson | A1 | A2 | Outbound | SCIP Normal | N | 00 | | |
| Steve Anderson | A1 | A2 | Outbound | SCIP Low | Y | 34 | | |
| Steve Anderson | A1 | A2 | Outbound | SCIP Normal | Y | 34 | | |

C:\StreamlinIDLog\Log12420l0-10223-PM.csv

FIG. 14

Log Analysis

The Log Analysis is done on a Log.CSV file and has the following sections:

Log Analysis Summary Page

This section describes summary level information derived from the log file chosen. This process does not change the .CSV file, so the source file will still be correct. Tester names are only printed in the summary and not on each detail line. The data gathered for frequency, S2N and jitter here is derived from the source .TDMS files found in the c:\StreamlinDiSamples folder. The date time information collected here should relate to a date/time on the log. But if any question results from this log the .CSV file should be looked at as this contains the date time and the exact .tdms files as it was collected and can be brought up in a text editor or MS Excel as needed.

Log Detail Page

This section displays most of the data on the .csv file with the exception of Tester Names, Special Configurations or Additional comments is found an "*" will be put in the last column of this section, indicating that data was found, and you should be able to find this on the next section of this report. Rounding on the frequency is limited to 2 decimal places, S2N is limited to 3 decimal places and jitter is limited to 5 decimal places. Once again if exact information is desired please refer to the .csv file which contains the data out to 6 decimal places. Subjective Line Quality is made up of two numbers that represent Signal Strength and Readability.

Log Notes Page

This section displays the notes from the special Configurations and Additional Comments sections of the testing log. The date/time will match with the Log Detail Page.

FIG. 15

Log Analysis Summary Page

Testers: Steve Anderson  Bill Anderson  John Anderson

Date/Time started collection  12/24/2009 12:29:45 PM  Date/Time ended collection  01/24/2010 01:08:19 PM Number of Calls Made: 9
Number of Calls-Successful 7  PCT 77.78
Number of Calls-Failed 2  PCT 22.22

Successful Attempts to go to SCIP Normal 9  PCT 90
Failed Attempts to go to SCIP Normal 1  PCT 10
Successful Attempts to go to SCIP Low 6  PCT 100
Failed Attempts to go to SCIP Low 0  PCT 0

Successful Attempts on DSN 12  PCT 92.31
Failed Attempts on DSN 1  PCT 7.69
Successful Attempts on PSTN 10  PCT 83.33
Failed Attempts to go to PSTN 2  PCT 17

|  | 600hz | 1800hz | 3000hz |
|---|---|---|---|
| Average Freq | 600 | 1799.32 | 3002.95 |
| Average s2n | 16.84 | 17.486 | 15.935 |
| Average Jitter | .06989 | .01196 | .00677 |

FIG. 16

Log Detail Page

| Test Number Date/Time | Local Location | Remote Location | Success or Fail Connection | Connection Direction | Telephone Connection Type | STE Mode | Subjective Line Quality | 600hz Freq | 600hz S2N | 600hz Jitter | 1800hz Freq | 1800hz S2N | 1800hz Jitter | 3000hz Freq | 3000hz S2N | 3000hz Jitter | Notes |
|---|---|---|---|---|---|---|---|---|---|---|---|---|---|---|---|---|---|
| 12/24/2009 12:29 PM | A2 | B1 | Y | Inbound | PSTN | Clear Mode | 00 | 599.92 | 17.093 | .06953 | 1799.24 | 17.409 | .01134 | 3002.87 | 15.519 | .00648 | |
| 12/24/2009 12:34 PM | A2 | B1 | Y | Outbound | PSTN | SCIP Normal | 00 | | | | | | | | | | |
| 12/24/2009 12:38 PM | A2 | B1 | Y | Inbound | PSTN | SCIP Low | 00 | 599.92 | 17.178 | .06854 | 1799.24 | 17.476 | .01114 | 3002.87 | 15.752 | .00628 | |
| 12/24/2009 12:39 PM | A2 | B1 | N | Outbound | PSTN | Clear Mode | 00 | | | | | | | | | | |
| 12/24/2009 12:42 PM | A2 | B1 | N | Inbound | PSTN | SCIP Normal | 00 | 600.2 | 17.739 | .06634 | 1799.5 | 19.067 | .01156 | 3003.13 | 18.195 | .00587 | |
| 12/24/2009 12:44 PM | A2 | B1 | Y | Inbound | PSTN | Clear Mode | 00 | 599.92 | 17.093 | .06953 | 1799.24 | 17.409 | .01134 | 3002.87 | 15.519 | .00648 | |
| 12/24/2009 12:49 PM | A2 | B1 | Y | Outbound | PSTN | SCIP Low | 00 | | | | | | | | | | |
| 01/24/2009 01:03 PM | A1 | A2 | Y | Outbound | PSTN | Clear Mode | 55 | | | | | | | | | | * |
| 01/24/2010 01:04 PM | A1 | A2 | Y | Outbound | PSTN | SCIP Normal | 55 | | | | | | | | | | * |
| 01/24/2010 01:05 PM | A1 | A2 | Y | Outbound | PSTN | SCIP Normal | 55 | | | | | | | | | | * |
| 01/24/2010 01:05 PM | A1 | A2 | Y | Outbound | PSTN | Clear Mode | 55 | | | | | | | | | | * |

FIG. 17

Log Notes Page

| Test Number Date/Time | Special Configuration | Additional Comments |
|---|---|---|
| 1/24/2010 1:03:48 PM | Test1 | Test1Test1Test1Test1Test1Test1Test1Test1 |
| 1/24/2010 1:04:17 PM | Test2 | Test1Test1Test1Test1Test1Test1Test1Test1 |
| 1/24/2010 1:04:43 PM | Test3 | Test1Test1Test1Test1Test1Test1Test1Test1 |
| 1/24/2010 1:05:08 PM | test3 | Test1Test1Test1Test1Test1Test1Test1Test1 |
| 1/24/2010 1:05:32 PM | test4 | Test1Test1Test1Test1Test1Test1Test1Test1 |

SYSTEMS, METHODS, AND DEVICES FOR TESTING COMMUNICATION LINES

CROSS-REFERENCE TO RELATED APPLICATION

This application claims the benefit of related U.S. Provisional Patent Application No. 61/484,028, filed May 9, 2011, the contents of which are incorporated by reference herein in their entirety.

FIELD OF THE INVENTION

The invention generally relates to systems, devices, and methods for testing communication lines.

BACKGROUND

Communication lines use a variety of different components. For example, phone calls can involve cell phone networks, publically switched telephone networks, voice-over-internet protocol, and a wide variety of different hardware. As service providers implement new technologies, the quality of their communication lines may vary.

Further, many communication systems involve mobile components. For example, one end of a phone call may take place on an airplane. The variety and mobility of different aspects of communication systems means that the quality of communication links is affected by variables that are constantly changing and unpredictable.

However, system users such as, for example, businesses or military, may require consistent, quality performance from communication systems. If a particular communication link is not performing up to a certain standard, important commercial or security-related communication may fail. To prevent this, communication customers use service-level agreements to contract for consistent quality service. However, given the global scope and high complexity of communication systems, having a contract in place does not guarantee that communication links will always meet minimum quality standards, such as those set out in SLAs.

Additionally, some communication systems are designed to handle secure communication protocols that require high quality service across a broad bandwidth. In some cases, the inability of a communication line to support secure communication may not be evident. Voice calls may go through without problems even though a line is compromised for security purposes, for example, due to insufficient quality or a breach of security.

SUMMARY

The invention generally relates to devices, systems, and methods for testing communication lines. The invention provides a device that can be coupled to a communication line at one end point and send a signal through the line comprising a number of known frequencies. Similarly, a device can receive the signal at another endpoint of a communication line. The receiving device samples the received signal to produce a digital signal and analyzes the different frequency components within the digital signal for quality. By measuring jitter, phase, signal strength, or noise, the receiving device can evaluate whether the communication line is operating to meet a certain quality standard. Devices and methods of the invention can be used with communication networks having complex, mobile, or variable components to determine if any given point-to-point communication line is operating at a certain quality. Communication lines can thus be evaluated for their quality as relevant to voice calls, service level agreements, or security protocols.

A key benefit of the invention includes the recognition that the human mouth and ear are intrinsically analog without encryption. By locating the test device as close to the user as possible, this system incorporates testing of complex communication streams including numerous variables and transforms (e.g. encryption, Analog to digital, Voice over IP, packet switching, ATM, SONET). Ultimately, it provides a simple interface to convert qualitative analysis to quantitative (numerical) analysis.

The invention provides network quality tracking, analyzing, recording, monitoring, and reporting tools. Devices and methods of the invention are used to measure quality of signals at a number of frequencies and the results of the measurements are stored. Stored results can be analyzed and patterns can be identified that indicate issues such as insufficient quality, trends or changes over time, and security breaches. Thus, systems and methods of the invention provide the ability to evaluate a communication line for an immediate quality determination as well as for analyzing trends, diagnosing problems, and selecting remedial measures.

In certain aspects, the invention provides a device for testing a communication line that includes a sampler with a jack for connection to a communication line. The sampler samples an analog signal received over the communication line. A processor and memory in communication with the sampler measures a quality of a known frequency in the sampled signal and stores the sampled signal and the measurement. The jack on the sampler can be a standard phone jack so that the sampler can be plugged into the handset jack on a telephone base unit using a phone cord. The sampler, or its housing case, can further include another phone jack where the handset of the phone can be plugged in. In this way, the sampler device sits between the base unit and the handset of the phone, and connects to the memory and processor, for example, by a USB cable. The memory and processor are preferably provided by a computer, such as a laptop. The computer runs an application that processes the incoming digital signal or issues a digital signal for sending over the communication line.

In this manner, two units of the device can be employed at the endpoints of a live communication line to test a quality of the line. A user can work at one end in "outbound" mode to cause the device to send a signal through the line, which is received by a user at the other end operating in "inbound" mode. Systems and methods of the invention operate by sending signals that include analog waves at a plurality of known frequencies. The processor at the outbound end issues instructions or a digital signal that causes the sampler at the outbound end to send analog signals that include the known the frequency. The sampler at the inbound end samples the analog signals and relays the digital version to the inbound processor, which can save the digital signal to the memory. The inbound processor further analyzes the digital signal, for example, by measuring strength, noise, or jitter at each known frequency. Where the inbound and outbound sub-systems are essentially or functionally the same as each other, they can reverse roles and become the outbound and inbound units, respectively. A sampler is generally any digital-to-analog or analog-to-digital converter such as an oscilloscope, e.g., a digital storage oscilloscope.

In certain embodiments, systems and methods of the invention operate in a communication mode, sending a number of frequencies of signal through the line. For example, the outbound sub-system can send at least two or three different frequencies. In embodiments, the outbound sub-system sends at least three frequencies, e.g., sequentially. In some embodiments, the outbound sub-system sends signals at 600 Hz, 1800 Hz, and 3000 Hz, for about seven seconds each, optionally separated by about two seconds. The inbound sub-system receives and digitizes these signals and analyzes them for noise or jitter, storing the results of the analysis so that a user can determine if the line is available for communication at a certain service quality level.

In certain embodiments, systems and methods of the invention operate in a security mode, sending a greater number of frequencies through the line. For example, the outbound sub-system can send more than five or six different frequencies such as, for example, ten different frequencies. In some embodiments, the security mode includes transmission of signals at 600, 1000, 1200, 1400, 1800, 2200, 2600, 3000, 3400, and 3800 Hz, or at 604, 1004, 1204, 1404, 1804, 2204, 2604, 3004, 3404, and 3804 Hz.

In certain aspects, the invention provides device for testing a telephone line comprising: a data acquisition device; a universal serial bus connector on the device; and a phone jack, wherein the device, responsive to instructions received via the universal serial bus connector, transmits an analog signal comprising a plurality of known frequencies through the phone jack. The device preferably can also receive and sample an analog signal to produce a digital signal and transmit the digital signal to a computer via the universal serial bus connection. That is, a device according to certain embodiments of the invention can operate as a digital-to-analog converter (DAC) in outbound mode or analog-to-digital converter in inbound mode. A DAC can be provided with a ruggedized housing case that includes connection hardware or jacks. For example, the case can provide the phone jack for connection to a telephone base unit, a handset jack for connection to the handset of a phone, or a USB jack for connection, for example, to a computer such as a laptop.

In certain aspects, the invention provides a kit for testing a communications line that includes a data acquisition device such as an oscilloscope as well as any of: a universal serial bus cable, a handset cable, a handset (regular or push-to-talk), a case (e.g., a rugged or shock-absorbing case with a handle, hinged lid, water-resistant gasket, or other features), a laptop, software application, or an instruction manual.

A kit according to the invention can be deployed with personnel in the field to test and evaluate communication links at their end-points. A kit can be used to plug into a telephone set, including by not limited special purpose telephones such as military and secure phones, or plug into an end point of a phone line using an included set, and operate in inbound or outbound mode to send a plurality of analog signals of varying frequencies to evaluate the quality of the line according to methods of the invention.

In certain aspects, the invention provides method for testing a communication line that includes receiving an analog signal having a number of known frequencies over a communication line and measuring a quality of the signal to provide the measurement to a user or store the measurement in a memory device. Any significant or relevant quality of the signal can be measured such as, for example, signal strength, signal to noise ratio, signal to noise and distortion (SINAD), jitter, or frequency. The incoming signal is preferably sampled and the measurement performed on the sampled, digital version of the signal (e.g., at a sampling rate above about 8 or about 10 KHz, or in ranges of 250 KHz or higher for more granular analysis). The digital version of the signal can be stored in memory, e.g., a computer-readable medium. In some embodiments, the frequencies are received serially (e.g., separately and one after another) or sequentially (e.g., separately, one after another and organized in an order), optionally separated by a brief interval (e.g., two seconds). Each frequency can be received for a duration, for example, of at least about two seconds. In some embodiments, each frequency has a duration of about five seconds or preferably about seven seconds, optionally separated by an about two second interval. Longer durations can provide a better baseline for analyzing signal to noise and other algorithms, while shorter durations can provide more data in a given operating time period.

The known frequencies can cover any technologically important bandwidth, such as is used for voice or data communication. In some embodiments, the frequencies define a bandwidth of at least about 1000 Hz, e.g., greater than about 2000 Hz. For example, the frequencies can include a frequency below about 700 Hz (e.g., about 600 Hz) and one above about 2000 Hz (e.g., about 3000 Hz), as well as an intermediate frequency (e.g., about 1800 Hz). In certain embodiments, the frequencies are 600 Hz, 1800 Hz, and 3000 Hz. In some embodiments, the plurality of known frequencies comprises at least five frequencies, i.e., nine or ten, or eleven or twelve.

Methods of the invention can be used to test any suitable communication line such as, for instance, a telephone line. Any end-to-end communication line can be tested, including lines that rely on any one or more of publically-switched telephone network, wireless network, private network such as a private branch exchange, or voice-over-internet protocol.

For example, an analog signal can be received over a line and through a telephone base unit, as well as optionally further relayed to a telephone handset.

Methods of the invention include receiving high and very high volumes of data such as, for example, greater than two megabytes per second for a number of seconds (i.e., 15 s, 18 s, 20 s, 30 s). Methods can include receiving an analog signal corresponding to ambient noise separately from receiving the analog signal. That is, before, between, or after the signals of known frequency, a device can be used to record or measure any sounds coming through a live or open line to provide a baseline or reference point.

In some embodiments, methods include a "communication" mode, in which the plurality of frequencies comprises a frequency between about 500 Hz and about 700 Hz; a frequency between about 1500 Hz and about 2000 Hz, and/or a frequency between about 2500 Hz and about 3500 Hz. In a security mode according to certain embodiments of the invention, the plurality of frequencies comprises more than five (e.g., ten) frequencies, at least one of which is below 1000 Hz and at least one of which is above 3500 Hz. Preferably, the plurality of frequencies include at least two (e.g., three) frequencies that define a bandwidth greater than about 2000 Hz.

Methods of the invention also include operating a device in an outbound mode and sending an analog signal comprising the known frequencies.

Methods of the invention can be used to determine if a communication line is capable of operating at a certain quality. For example, a user can provide a criterion such as a threshold value for acceptable jitter or signal to noise and measurements can be made and compared to the threshold value. In this way, the suitability of the line for certain applications can be reported to the user.

Methods of the invention can be mediated through a computer interface. For example, a display can be provided that shows an image of part of a signal, such as a graph or waveform showing an amplitude of a received signal at a certain time or frequency.

In certain aspects, the invention provides a device for testing a communication line in which the device includes a memory coupled to a processor configured to exercise program instructions to cause the processor to receive an incoming digital signal from an analog digital converter—the incoming digital signal including data generated by sampling at a known sampling rate analog audio signal comprising a known frequency—and measure an amount of noise associated with known frequency. In some embodiments, the analog signal includes a second known frequency and the processor further measures an amount of noise associated with the second known frequency. The digital signal and any measurements can be stored in the memory (e.g., in a database). The device provides information about a quality of the signal to a user. A user can supply a value for a reference standard, such as a threshold value for jitter or noise, and the processor can compare the measured signal to this threshold. By such means, the processor analyzes the saved signal and evaluates whether a communication channel is capable of operation according to the predetermined standard and provide a result of the evaluation to a user. The quality measured can be noise as indicated, for example, by a signal to noise ratio or by SINAD. The processor can create a display of a graph of the incoming signal showing amplitude on, for example, a computer monitor. In certain embodiments, the device is a computer such as a laptop computer or tablet (e.g., running Windows operating system).

In some embodiments, the processor is further configured to send a digital signal to a digital analog converter, i.e., to cause the converter to emit an analog signal including the known frequency and the second known frequency.

BRIEF DESCRIPTION OF THE DRAWINGS

FIG. 5 shows a screen for setting parameters for a basic test.

FIG. 8 shows a screen for setting parameters for an extended test.

FIG. 14 shows a screen listing records of sent and received signals.

FIG. 15 depicts a summary of a report provided by methods and devices of the invention.

FIG. 16 shows a report provided by the invention that includes measurements of qualities of signals comprising three known frequencies received according to methods and devices of the invention.

FIG. 17 shows a detailed report provided by methods and devices invention that includes measurements of qualities of signals comprising three known frequencies received according to methods and devices of the invention.

FIG. 18 shows a log notes page according to the invention.

DETAILED DESCRIPTION

Figure 1:
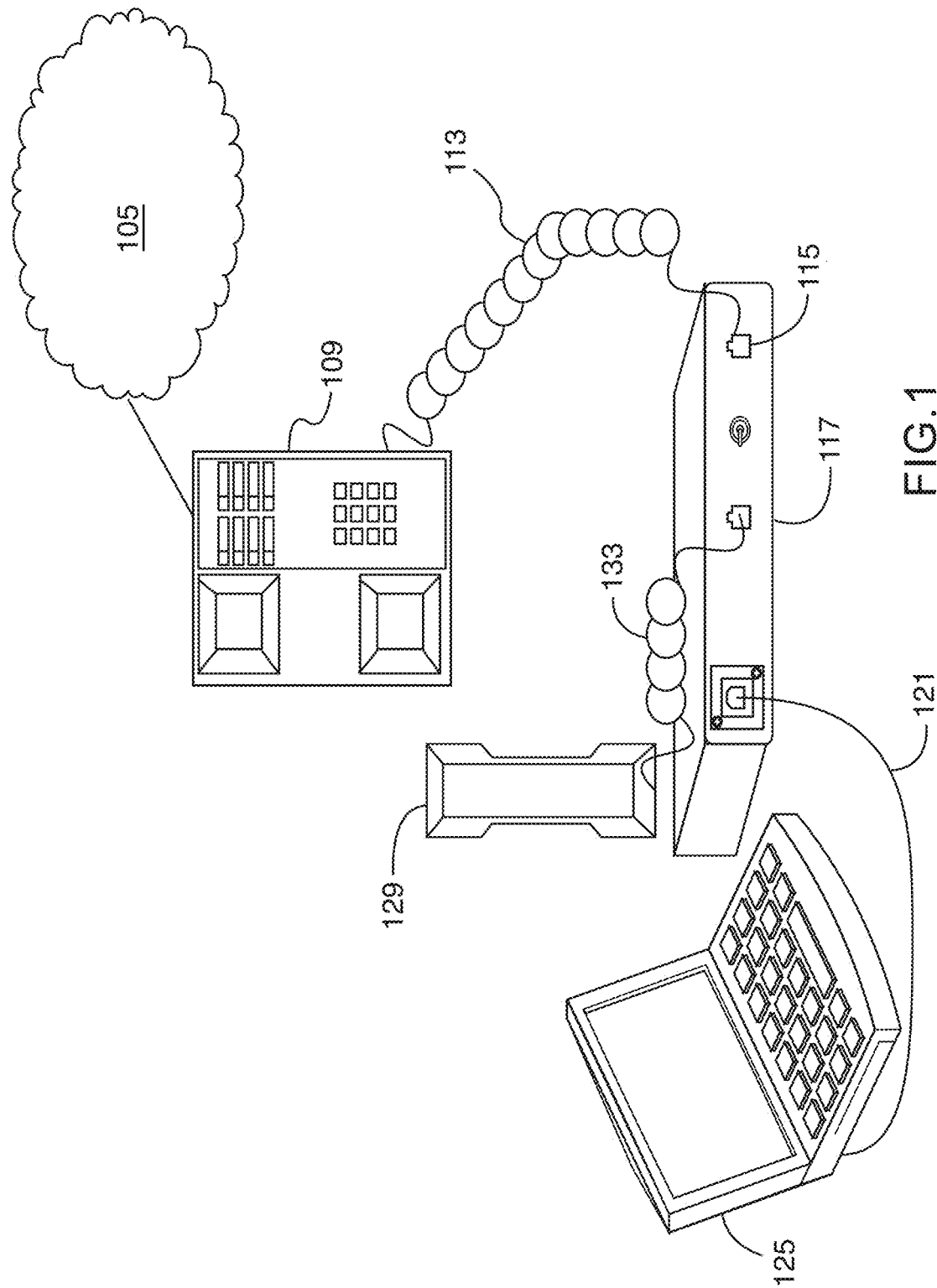
FIG. 1 shows a system according to certain embodiments of the invention.

The invention generally provides systems, methods, and devices for testing a communications line or component of a network. A communications line, generally, is any telephone or data line that provides for data transfer or telephony, and includes—alone or in combination—telephone lines (e.g., publically switched telephone networks (PSTN)), data lines (e.g., digital subscriber lines (DSL)), wireless connections (e.g., 3G and 4G cellular connections, Wi-Fi, satellite connections), as well as numerous other lines, public or proprietary (e.g., fiber optic lines, dedicated private lines, Defense Switched Network (DSN), Automatic Voice Network (AUTOVON), etc.). For example, a person may place phone call from a laptop computer using voice-over internet protocol (VoIP) communication services offered under the Skype mark by Skype Technologies S.A. (Luxembourg City, LU), a division of Microsoft (Redmond, Wash.). The call may be received by a party via a rotary phone on a landline connected to the PSTN. A device of the invention may be employed at either or both end of the call to test a quality of the network.

The invention includes systems and methods for testing communication lines in airborne networking systems. Systems of the invention can operate over communication systems that employ ultra-high frequency (UHF) or narrow band frequency modulation (NBFM) technologies. In some embodiments, a communication line includes push-to-talk transmitters at either or both ends. A communication line can include a point-to-point link or a satellite communication (SATCOM) link (e.g., Ku, C, or X band satellite link), and can further include one or more fixed or mobile ground entry point (GEP). In certain embodiments, one end of a communication line is mobile, for example, on a vehicle such as an aircraft (e.g., E-4B National Airborne Operations Center aircraft, E-6B Airborne National Command Post Aircraft, Air Force One, or other aircraft). Systems and methods of the invention are operable with communication networks that provide full-duplex, multi-channel (e.g., 15 channel) voice and data communication over a T-1 circuit path. In certain embodiments, a SATCOM link links an aircraft to a ground network via a GEP. Aircraft communication systems are discussed in U.S. Pat. No. 6,677,888; U.S. Pub. 2011/0099371; U.S. Pub. 2009/0282469; U.S. Pub. 2009/0187976; U.S. Pub. 2007/0077626; and U.S. Pub. 2007/0042774, the contents of each of which are incorporated by reference herein in their entirety for all purposes.

In a preferred embodiment, two systems of the invention that are substantially similar are plugged into two different phones that are capable of calling one another. A coordination call is placed, using either the phones or another pair of phones, and two users talk over the coordination call to coordinate use of the systems. At least one of the users uses their system in outbound mode while the other user users their system in inbound mode. The outbound system generates a tone and sends it as if it were an audio tone over the line to the inbound system. The inbound system receives and digitizes (i.e., samples) the tone and measures a quality of the tone using a processor. In certain embodiments, the system operates in a basic communication mode and tests the line with a small number of tones, such as, for example, one, two, three or four. In an alternative or additional embodiment, the system operates in an extended mode and tests the line with a larger number of tones, typically five or greater, e.g., ten.

A system for use at one end of a line is depicted in FIG. 1. Typically, a system includes an analog-digital conversion device (ADC) 117. Device 117 includes jack 115 for connection to telephone base unit 109, via phone cord 113. In certain embodiments, device 117 further includes a port for connection to a computing device 125 and optionally a jack for plugging in a handset 129 of a telephone. In some embodiments, computer 125 is connected to device 117 by USB cable 121, and handset 129 is connected to devices 117 via phone cable 133. Base unit 109 connects to communication network 105, typically via whatever connection was in place prior to the use of systems of the invention. That is, the invention provides systems and methods for testing existing phone and data lines. Testing lines is discussed in U.S. Pat. No. 5,559,854; U.S. Pat. No. 4,301,536; U.S. Pat. No. 3,965,418; and U.S. Pub. 2009/0168972, the contents of each of which are hereby incorporated by reference in their entirety for all purposes.

Figure 2:
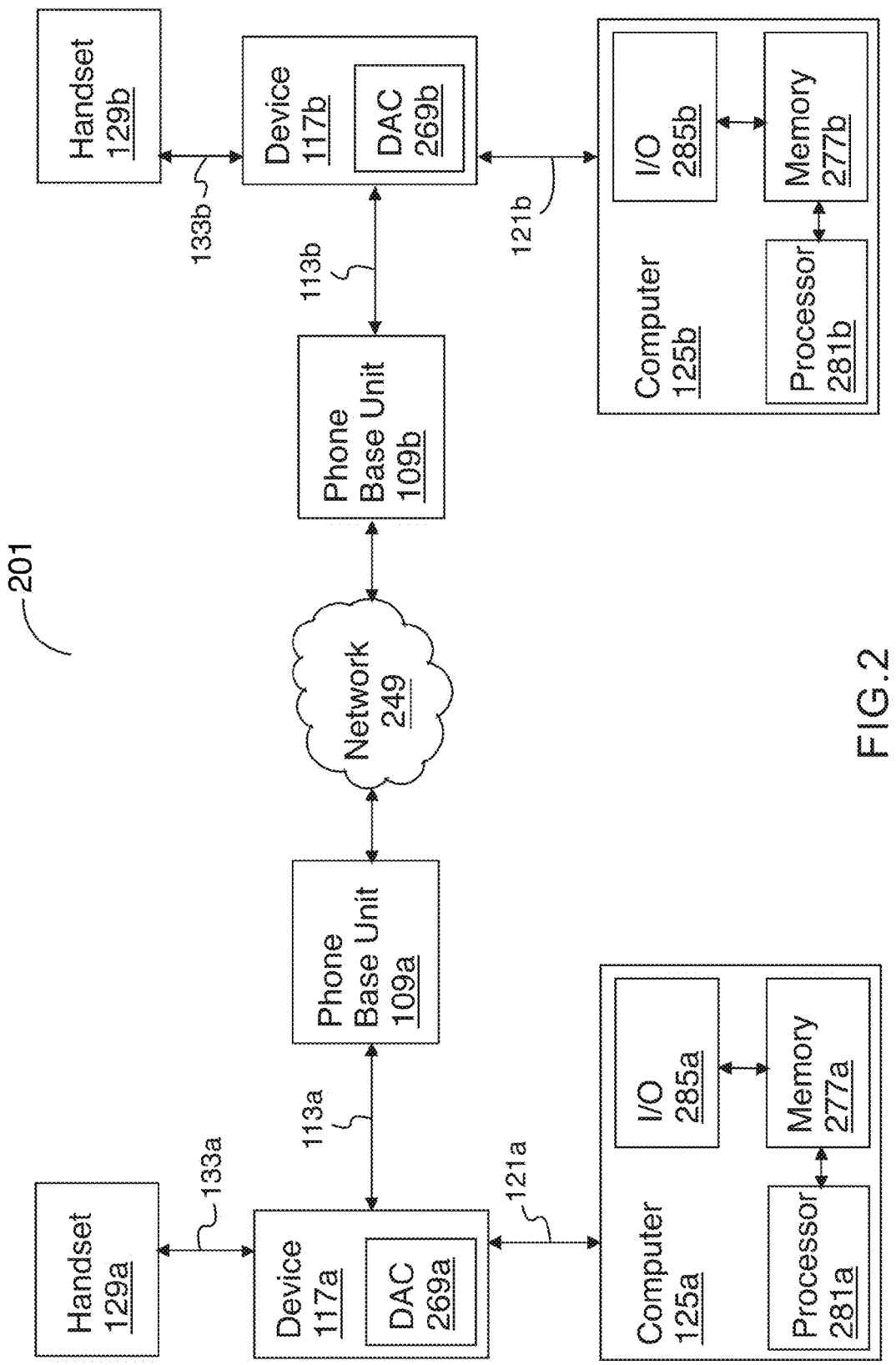
FIG. 2 is a diagram of a system according to certain embodiments of the invention.

Device 117 generally contains an analog-to-digital converter (ADC) or a digital-to-analog converter (DAC) 269 (FIG. 2). An ADC and DAC 269 are generally the same thing, although the invention includes systems that use a dedicated ADC or DAC. Generally, DAC 269 is used herein to describe an ADC, sometimes also called an oscilloscope. An oscilloscope is generally a synonym for a species of DAC 269. DAC 269 is also sometimes referred to as a sampler and can be defined by its function, the conversion of an analog signal to a digital signal or the production of an analog signal.

Any sampler or oscilloscope compatible with systems and methods of the invention may be used for any one of DAC 269 including, for example, the portable analog oscilloscope model 475A sold by Tektronix (Beaverton, Oreg.). Preferably, DAC 269 is a digital storage oscilloscope, such as, for example, digital oscilloscope model TDS210 sold by Tektronix (Beaverton, Oreg.). Other units that can provide DAC 269 include 'Digital Storage Oscilloscope with Panels' sold under SKU TOL106C3M or the 'DSO Quad—4 Channel Digital Storage Oscilloscope' sold under SKU TES101D2P, both available on the website called seeedstudio maintained by Seeed Technology, Inc. (Shenzhen, Conn.). A system of the invention can use, for DAC 269, a NI USB-6211 oscilloscope sold by National Instruments (Austin, Tex.). In some embodiments, DAC 269 is provided by a DSO-2090 PC USB Digital Oscilloscope 100MS/S 2ch sold under the trademark Hantek by VistaTech (Niagara Falls, N.Y.) or the PCSU 1000 two-channel USB PC Oscilloscope sold by Velleman, Inc. (Fort Worth, Tex.). Oscilloscopes are discussed in U.S. Pub. 2011/0267036; U.S. Pub. 2010/0052653; U.S. Pub. 2003/0219086; and U.S. Pat. No. 6,459,256, the contents of which are incorporated by reference herein in their entirety for all purposes.

In certain embodiments, DAC 269 is provided by the hardware within a PC such as, for example, a memory, processor, and soundcard, as configured through the use of a program application. Any suitable program for a PC-based oscilloscope is included in the invention such as, for example, GoldWave v5.67 Digital Audio Editor available from the website of GoldWave, Inc. (St. John's, Calif.) or Multi-Instrument 3.2 from Virtins Technology (Singapore) and available for download from the CNET website maintained by CBS Interactive (San Francisco, Calif.).

DAC 269 can also be provided as part of a device 117 having a custom form-factor and/or operated by firmware or a field-programmable gate array configured to generate an analog signal or sample an incoming analog signal, and may include a processor 281 and memory 277 within device 117. In some embodiments, DAC 269 is device 117. DAC devices are discussed in U.S. Pat. No. 5,121,342; U.S. Pub. 2004/0027138; and U.S. Pub. 2003/0034767, the contents of each of which are incorporated by reference herein in their entirety.

In a preferred embodiment, DAC 269 is a digital storage oscilloscope housed within device 117 and connected to a computer 125 via USB cable 121. Use of such a system is illustrated in FIG. 2. As shown in FIG. 2, a first system includes device 117a connected to computer 125a via USB cable 121a. Device 117a includes DAC 269a (e.g., a NI USB-6211 oscilloscope sold by National Instruments (Austin, Tex.)) connected to a base unit 109a of a telephone via phone cord 113a. Handset 129a is also connected to device 117a, through phone cord 133a. Computer 125a can be any computer, such as a Mac or a PC type laptop, and generally includes input/output hardware 285a (e.g., keyboard, monitor, mouse or trackpad, Wi-Fi card, Ethernet connection, CD or DVD drive, touchscreen, USB port, or disk drive). Processor 281a connected to memory 277a coordinates the operation of the system and performs steps of methods of the invention.

Generally, one such system will operate in outbound mode in communication with another such system operating in inbound mode. The inbound and outbound systems can be substantially exactly the same, although they need not be. As shown in FIG. 2, system 201 includes an inbound sub-system having device 117b (including DAC 269b) connected by phone cord 113b to phone base unit 109b as well as by USB cable 121b to computer 125b (that includes input/output hardware 285b as well as memory 277b coupled to processor 281b). Handset 129b is connected to device 117b by phone cord 133b.

The inbound system shown in FIG. 2 (DAC 269b, processor 281b, and memory 277b) tests a communication line in network 249 by receiving an analog signal sent by the outbound system. Here, DAC 269b, processor 281b, and memory 277b provide the essential components of a system for testing a communication line. These components can be provided by a dedicated device 117b and a computer 125b, or they can be provided by a single device or other combination of devices with appropriate hardware, firmware, or software to perform the functions described herein. As shown in FIG. 2, device 117b is connected to a communication line through a jack 115 (see, e.g., FIG. 1). Jack 115 may be any standard phone plug such as a female 4P4C connector. DAC 269b is provided by a sampler (e.g., a NI USB-6211 oscilloscope) coupled to jack 115. The sampler receives an analog signal through the base unit 109b of a phone that have been transmitted over the communication line and samples the analog signal. The analog signal includes one or more "tones" or signal components having a known frequency. As used herein, analog signal, tone, or frequency in a signal refer to a continuous electronic signal wherein variations in voltage or current can be described as the analog of a sound. An analog signal may be digitized and transmitted over part or all of a communication line as a digital signal (i.e., packets of information according to an internet protocol) and further, a digital signal may be transmitted as electronic impulses over, for example, copper wires (e.g., a digital subscriber line) or light impulses over an optical network. Communication over packet networks is discussed in U.S. Pat. No. 6,775,240, the contents of which are hereby incorporated by reference in their entirety for all purposes. Such a signal is an analog signal to the extent that it includes information representing analog frequencies, sound, tones, human voice patterns, or known waveforms.

The sampler samples the received analog signal and provides digital data for processing by processor 281b or storage in memory 277b. In general, sampling according to the invention is performed at a sampling rate at least double the value of a known frequency in the received signal. For example, in certain embodiments, when the received signal includes a signal component at 3804 Hz, the signal is sampled at least at 7608 samples/sec (7.608 KHz), e.g., 10 KHz. In some embodiments, the signal is sampled at about 250 KHz or about 100 KHz. Methods for analog-to-digital conversion (i.e., sampling) and digital-to-analog conversion (e.g., tone generation) as well as software and hardware for implementation are discussed in Smith, S. W., The Scientist and Engineer's Guide to Digital Signal Processing, 1997 California Technical Publishing, San Diego, Calif., pp. 34-86, the contents of which are incorporated by reference herein in their entirety.

The incoming signal to be sampled is received via phone cord 113 plugged into base unit 109 of a telephone. As used herein, telephone 109, handset 129, phone cord 113, or phone cord 133 are each part of the communication line to be tested, the system for testing the communication line, or both. In some embodiments, a system is provided that includes device 117 and computer 125 for testing a communication line that includes an existing telephone. In some embodiments, a system is provided that includes device 117, computer 125, and a telephone (including but not limited to traditional analog phones, digital VoIP phones, or Military style encrypted phones) for testing an existing communication line, e.g., without regard to whatever phone hardware may be connected to the communication line.

Preferably, a system according to the invention can operate in inbound mode and in outbound mode. In outbound mode, device 117 sends an analog signal into the communication line. For example, processor 281 can issue a digital signal and send it to DAC 269. DAC 269 operates to issue a corresponding analog signal including a signal component having a known frequency and send the analog signal out.

The communication line is tested by measuring, at the inbound system, a quality of the known frequency signal component that is received. Generally, processor 281 will measure a quality of the sampled, digitized signal. Any quality of interest may be measured such as, for example, signal strength, jitter, signal-to-noise ratio, signal-to-noise with distortion (SINAD), frequency, or power. Jitter generally refers to a measure of deviation of instants of a signal from their ideal position or the variation in period, frequency, or phase of a signal as compared to its ideal value. Jitter and its measurement are discussed in U.S. Pat. No. 7,339,364; U.S. Pat. No. 6,701,269; U.S. Pat. No. 6,240,130; and U.S. Pub. 2001/0038674, the contents of each of which are incorporated by reference herein in their entirety. SINAD generally includes measurements of power level S of a test tone, noise level N, and distortion level D according to (S+N+D)/(N+D). Measuring signal qualities is discussed in U.S. Pat. No. 6,128,510; U.S. Pat. No. 5,987,320; U.S. Pub. 2007/0111670; and U.S. Pub. 2004/0161028, the contents of each of which are incorporated by reference herein in their entirety.

Figure 3:
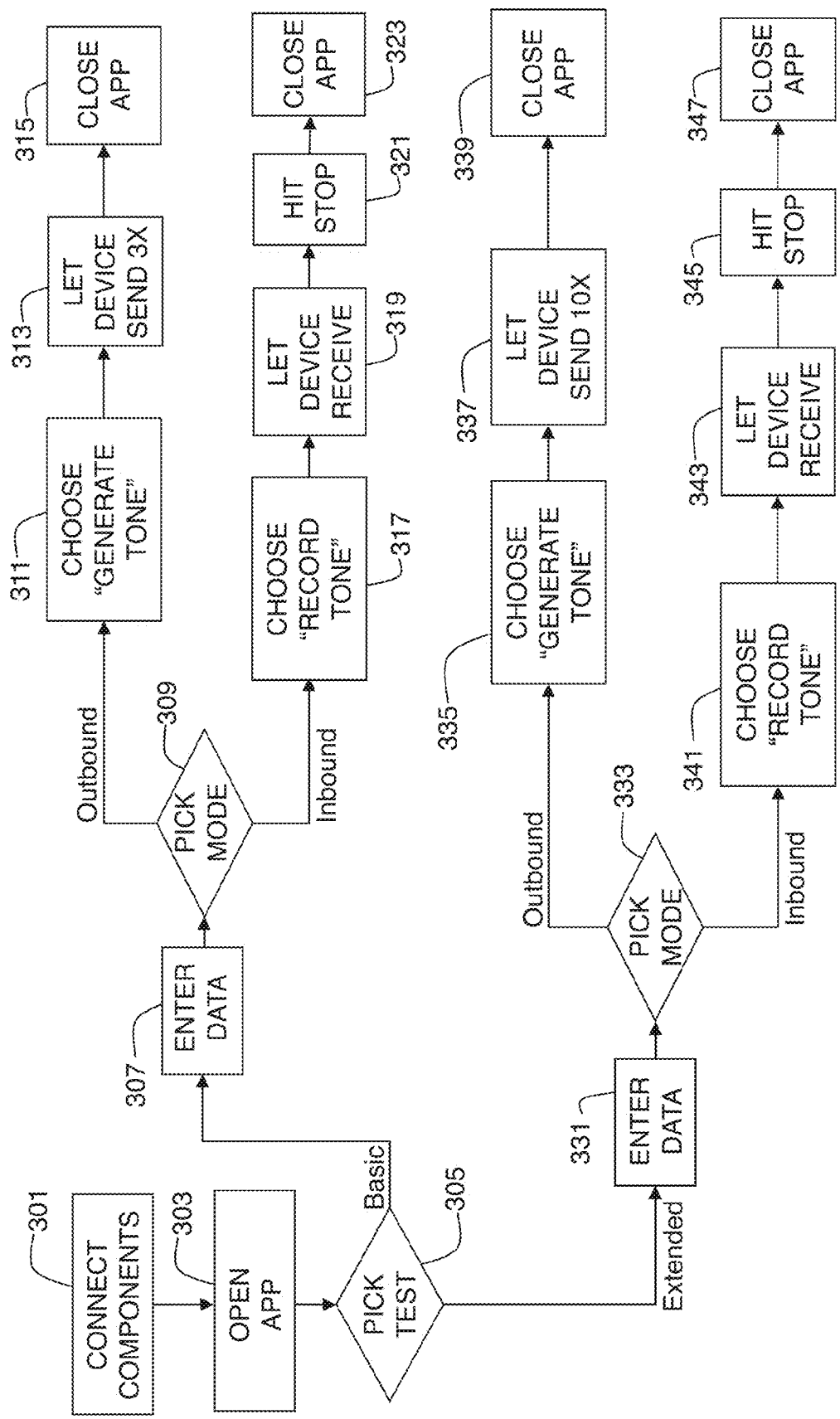
FIG. 3 is a flow chart diagramming methods of the invention.

In certain embodiments, a system of the invention operating in inbound mode receives and digitizes an analog signal comprising a plurality of tones of known frequencies. Preferably, the analog signal is sent by a substantially or essentially similar system. For example, in some embodiments, the invention provides a system comprising a device 117 and a laptop computer 125 housed together (e.g., in a carrying case). Any number of these systems may be deployed with personnel into the field. When a communication line is to be tested, a user connects a system at one end of the line and another user connects a system at the other end. Either or both user operates their system in inbound or outbound mode. The outbound system sends the signal with a plurality of tones (e.g., three, such as a 600 Hz component, an 1800 Hz component, and a 3000 Hz component) operating in a basic test mode. Another use operates a system in inbound mode to receive and sample the signals. FIG. 3 is a flow chart diagramming methods of the invention.

As shown in FIG. 3, a user may connect 301 components of the system as described above, and the open 303 a program application (App) for performing a test. A user can then pick 305 which test—basic or extended—to perform using the main menu shown in FIG. 4.

To perform a basic test, the user can enter 307 data into an information screen (FIG. 5) and then pick 309 whether they will operate in inbound or outbound mode. In outbound mode, the user may choose 211 the "generate tone" button (see FIG. 5) and let 313 device 117 send an analog signal that includes a plurality of tones of known frequencies (e.g., three). When done, the user should close 315 the app. The user at the receiving end who picks 309 inbound mode will choose 317 the "record tone" button (see FIG. 5) and let 319 their device 117 receive the signal. In certain embodiments, the user will hit 321 a stop button (pictured in FIG. 7); view, save, or report any measurements; and close 323 their app.

In the extended mode, the steps are substantially similar. A user can enter 331 data into an information screen (FIG. 8) and then pick 333 whether they will operate in inbound or outbound mode. In outbound mode, the user may choose 335 the "generate tone" button (see FIG. 8) and let 337 device 117 send an analog signal that includes a plurality of tones of known frequencies (e.g., ten). When done, the user should close 339 the app. The user at the receiving end who picks 333 inbound mode will choose 341 the "record tone" button (see FIG. 8) and let 343 their device 117 receive the signal. In certain embodiments, the user will hit 345 a 'Stop Acquiring Data' button (pictured in FIG. 9); view, save, or report any measurements; and close 347 their app.

Figure 4:
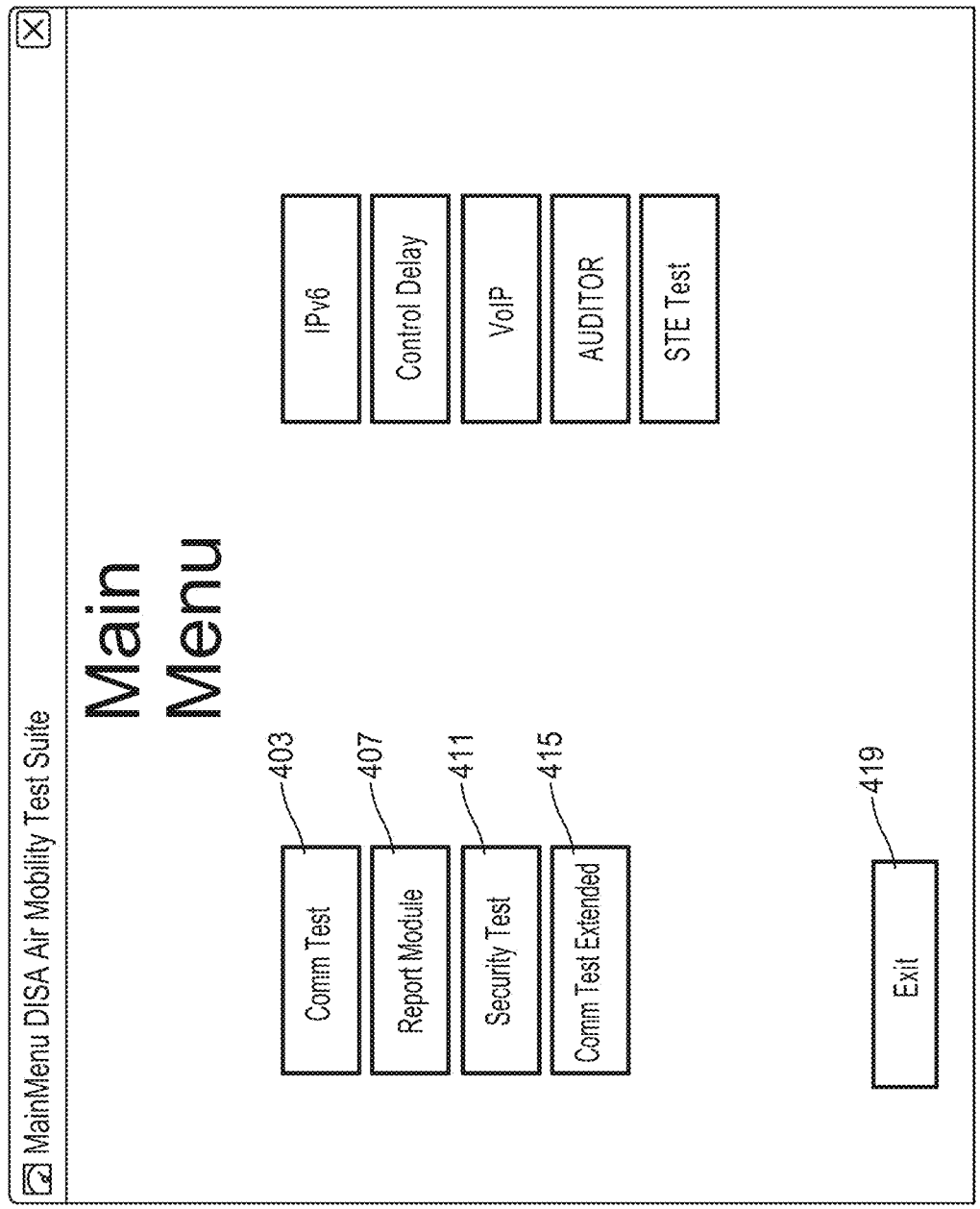
FIG. 4 shows a main menu as displayed on a device.

In certain embodiments, systems and methods of the invention offer a basic test or an extended test and allow a user to pick 305 which test on a main menu displayed on input/output device 285a (e.g., a monitor of a laptop or a touchscreen of a tablet computer) of computer 125a. An exemplary main menu is shown in FIG. 4 and includes a "Comm Test" button 403 to choose the basic communication test; a "Report Module" button 407 to generate reports; a "Security Test" button 411 to perform security tests; a "Comm Test Extended" button 415 to perform the extended test; and an "Exit" button 419 to exit the app.

Figure 5:
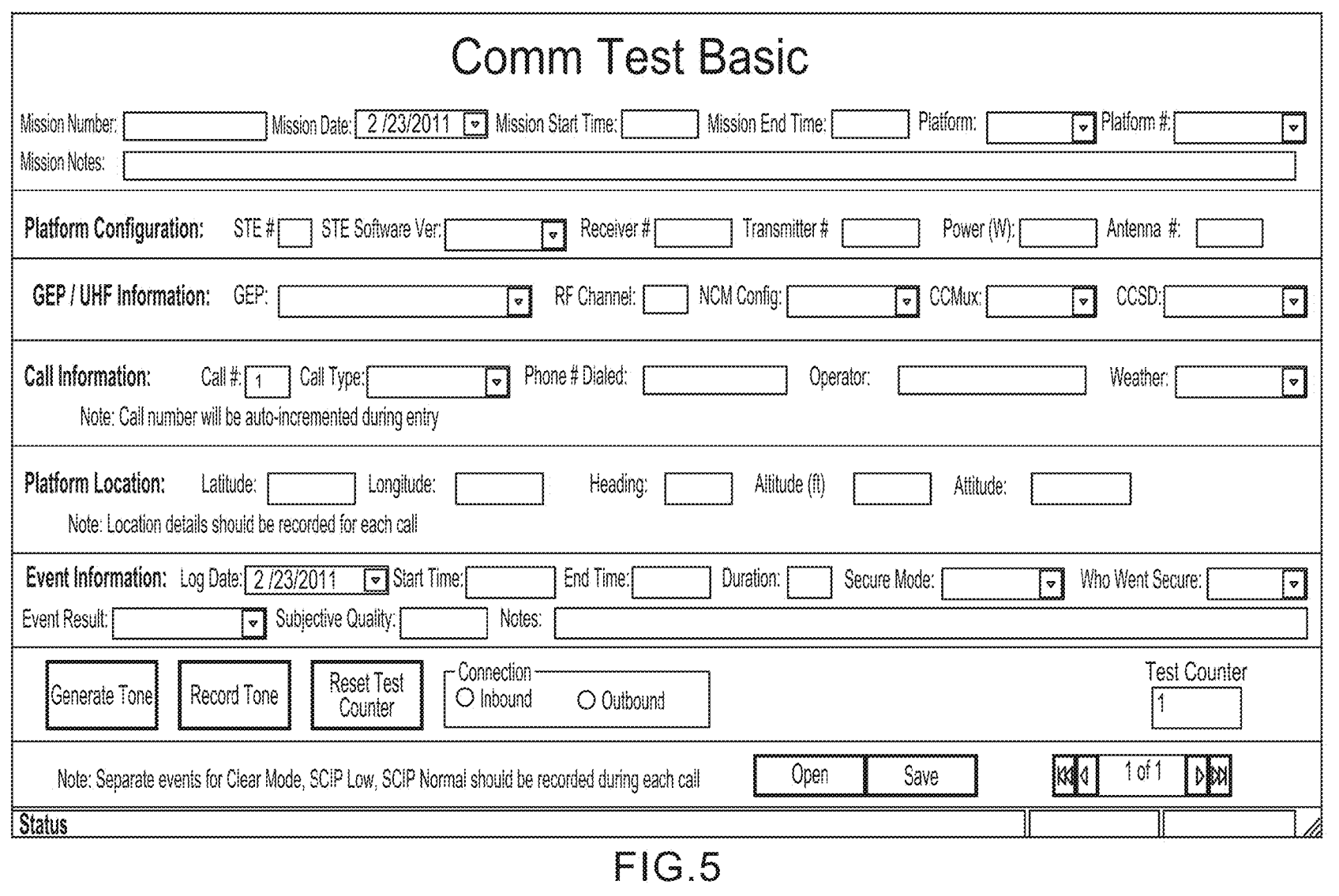
Figure 6:
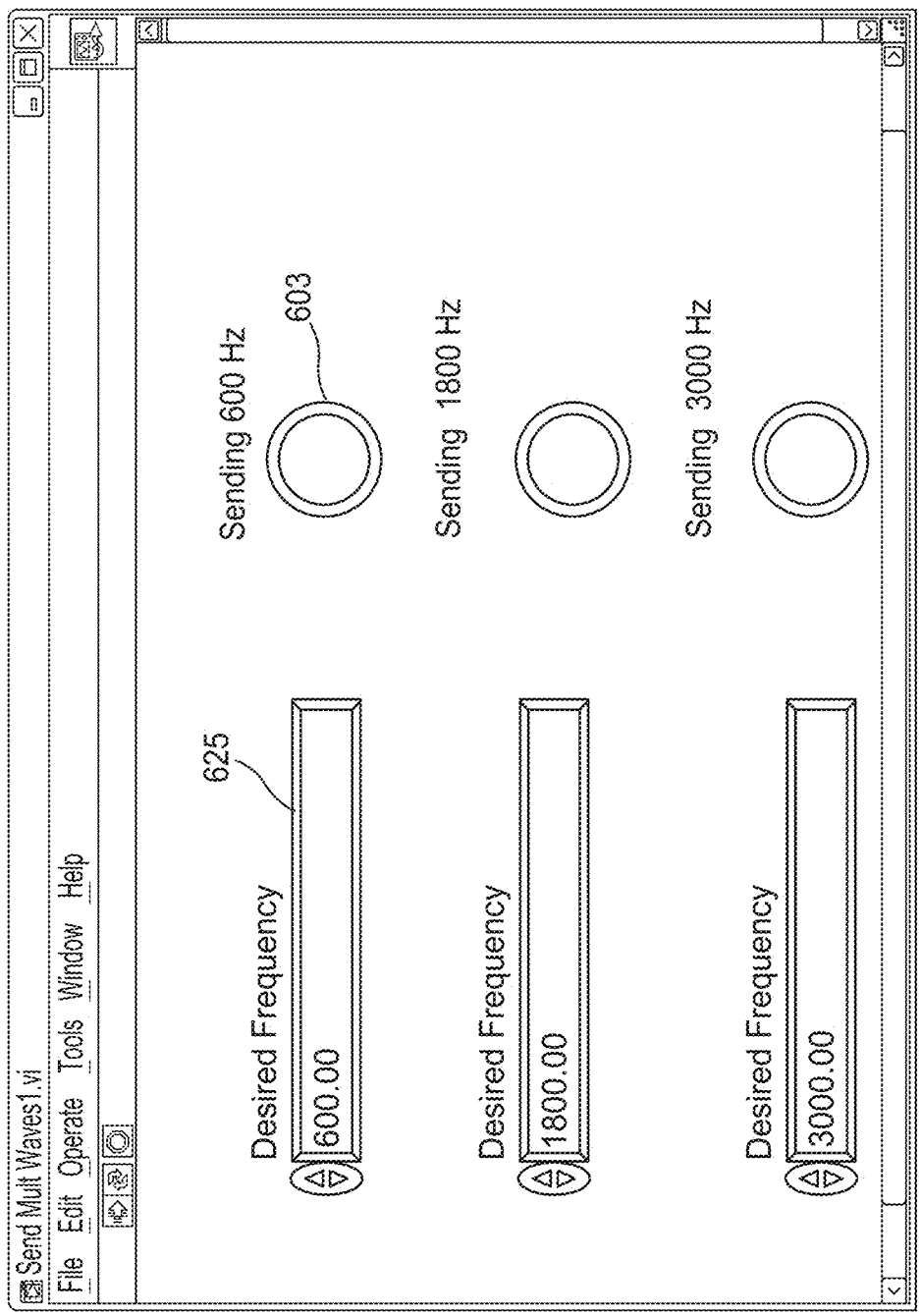
FIG. 6 depicts a screen shown during tone generation and sending.

Choosing the "Comm Test" button 403 will bring up the parameter screen shown in FIG. 5. Here, a user at the outbound or inbound end can provide data relevant to the communication line being tested or the test event itself. Exemplary data that can be received and stored include mission data (times, dates, numbers, notes), platform number (phone number, software version, hardware or power information), ground entry point/UHF data (identity of GEP, RF channel, etc.), call information, platform location (coordinates, heading, or altitude, particularly where test point is on an aircraft), and event information.

Where a user chooses to operate in outbound mode, the user will select the "Outbound" radio button under "Connection" as shown in FIG. 5, and click on the "Generate Tone" button. In certain embodiments, this will invoke the window shown in FIG. 6, listing outbound frequencies in one or more of frequency window 625 while illuminating corresponding send indicator 603.

As indicated by the exemplary screen shown in FIG. 5, systems and methods of the invention offer a basic level test. In this exemplary embodiment, an analog signal is sent over the communication line that includes three components having known frequencies of 600 Hz, 1800 Hz, and 3000 Hz (see FIG. 6). In certain embodiments, the three tones are transmitted in series, for seven seconds each, with two seconds of silence between each. Program instructions in a computer program application stored in memory 277a are used to configure processor 281a to send a signal to DAC 269a causing DAC 269a to send the analog signal according to this pattern.

A user operating a system in outbound mode may also make a coordination call to another user operating a system in inbound mode. In some embodiments, operation of two systems is coordinated extrinsically, for example, by two people communicating through a separate phone call, over the phone line being tested, or by prior arrangement. In certain embodiments, coordination of a system operating in inbound mode with a system operating in outbound mode is provided intrinsically by components of the system. For example, each system may be programmed to operate in a quasi-idle "listen" mode whenever turned on or connected to a line. A user may initiate an action at one system that causes it to begin operation and to send an operating signal to a system at the other end of the communication line being tested. The operating signal can cause the other system to become active (i.e., no longer be in a quasi-idle "listen" mode). Thereafter, the two systems can function in synchrony or cooperation, for example, either through each following a program with compatible timings (e.g., the operating signal causes the outbound system proceeds to idle for about five seconds, then send a signal for about 20 seconds, and then cease, while the same operating signal causes the inbound system to wait about two seconds, then begin receiving and recording, receive and record for about 27 seconds, and then stop) or each system following a program with synchronized timings (e.g., inbound system transmits a "go" tone that causes outbound system to send first signal followed by an "over" tone; upon receipt of "over" tone, inbound signal pauses a second then sends a second "go" signal; this can be repeated until outbound system sends "over and out" signal; then both systems stop). In some embodiments, both systems operate under clock-based synchrony in which, for example, under instructions from one of the systems or extrinsic input, inbound system begins recording at a pre-selected time (e.g., 10:00:00) and stops recording at a preselected time (e.g., 10:00:26) while outbound system transmits for seven seconds beginning at the pre-selected time, followed by two seconds of silence, then another seven second signal, another two second silence, and a final seven second signal.

Figure 7:
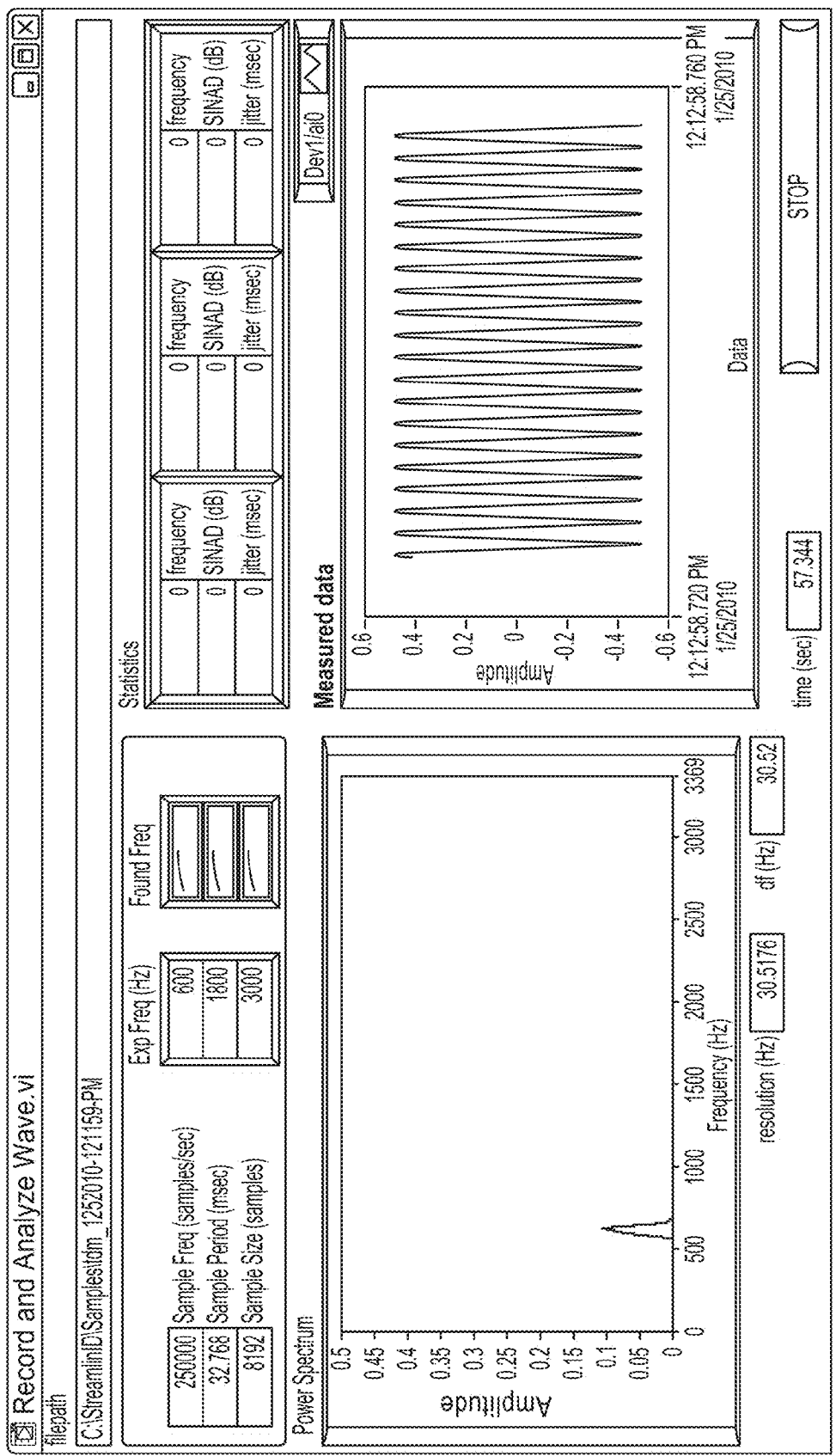
FIG. 7 depicts a screen shown during tone receiving and recording.

In certain aspects, systems and methods of the invention include a server computer operable to communicate with one or more of computer 125. For example, in certain embodiments, one or more system as depicted in FIG. 1 is connected to a network (e.g., permanently or in "standby" mode) and a server computer periodically triggers operation of one or more of DAC 269 and processor 281 to perform operations of methods of the invention. In this way, systems and methods of the invention can be employed to test a communication line automatically, i.e., without human participation or intervention. Computer 125 can be communicatively coupled to a server computer via an internet connection such as an Ethernet cable plugged into an Ethernet port, a 3G or 4G cellular modem, or via a Wi-Fi connection provided by a Wi-Fi card. One skilled in the art will recognize that most computers suitable for use as computer 125 (e.g., laptops, desktops, iPads, smartphones, tablets, etc.) include at least one such data connection device. In a server-client embodiment, a server can coordinate the operation of systems of the invention operating in inbound mode, outbound mode, or both. Also or in the alternative, a server can manage data collection, analysis, or storage. Any signals received, measurements of those signals, logs, summaries, notes, or other data can be sent to a server for storage or analysis.

Where a user chooses to operate in inbound mode, the user will select the "Inbound" radio button under "Connection" as shown in FIG. 5, and click on the "Record Tone" button. In certain embodiments, this will invoke the window shown in FIG. 7, showing information about the received, sampled, and recorded inbound signal.

The inbound recording and analyzing window can display a graph of amplitude per frequency, a graph of an incoming wave, a sampling rate, other information about sampling, or any other data that may be useful to the tester. In certain embodiments, an inbound window will display an elapsing time counter or an amount of inbound date (e.g., in MB) received and saved. The display may also include file path, mission parameters (e.g. participant IDs, information about the types and identities of components in the communication line), information about the local system (crypto card installed, computer type, sampler type), or other information.

In certain embodiments, the inbound recording window presents GUI controls to a user including preferably a stop button. During recording, a user may be presented with GUI elements for controlling the sampler (e.g., change the sampling rate, pause or suspend sampling, cause the sampler to "barcode" the incoming tone signal with additional digital data) or for controlling the computer (e.g., cause the computer to "barcode" the data or add metadata tags identifying a unique time point of interest within a signal or adding information about the signal or session, turn off the computer's Wi-Fi card or other hardware, trigger the operation of another computer application to, for example, analyze, save or report data).

A system of the invention operating in outbound mode can barcode an outgoing tone signal. To barcode a signal refers to adding data, such as analog or digital codes, that communicate information. For example, an analog signal can be sent that includes a component of a known frequency and a barcode component, such as a metadata tag that can be detected and interpreted by a receiving device. A barcode or tag can include a unique identifying number or other data.

In certain embodiments in which inbound and outbound systems are synchronized, run automatically, or are extrinsically controlled (e.g., by their own internal clocks, via a prior extrinsic coordination call by humans, by a server, by a series of control signals from one system to the other), windows, GUI elements, and interfaces at one end or the other may be displayed with minimal information, or no user controls, or not displayed whatsoever. For example, in certain embodiments, operation of an outbound system sends control signals that "wake up" the inbound system and control its operation. In this exemplary embodiment, the inbound system may not display the window shown in FIG. 7, or may display a "grayed out" or non-interactive version. Input/output mechanism 285b of inbound system computer 125b may not even include a monitor, touchscreen, or video display. For example, where one system is automatic and operates without human intervention (e.g., by control signals from another system, a server, or a CRON utility within itself), input/output mechanism 285b may consist of a data connection such as an Ethernet port, Wi-Fi card, or phone jack.

For example, in certain embodiments, an inbound system or outbound system is controlled solely or primarily for sending and receiving by a cron table (e.g., where computer 125 functions on a UNIX or LINUX operating system). A shell script, Perl program, or like can be written and stored in memory 277 in a bin sub-directory of a usr directory, the script including all commands to execute program applications of the invention at scheduled times.

In certain embodiments, an inbound system functions by "pinging" a remote computer causing the remote computer to send an analog signal back to the inbound system. For example, the remote computer can be a server configured to receive send requests and to the respond to them by sending a signal according to the invention. A server can be operably coupled to DAC 269. For example, the server can be a Hitachi Compute Blade 500 computer device sold by Hitachi Data Systems (Santa Clara, Calif.). The server can include a E5-2600 processor sold under the trademark Xeon by Intel Corporation (Santa Clara, Calif.). Remote DAQ 269 can be a 6000L series oscilloscope or similar (e.g., the DS06054L, DSAX96204Q, or MS09404A) sold by Agilent Technologies, Inc. (Santa Clara, Calif.). Program instructions on the server can respond to action of the inbound system by causing the server and remote DAQ 269 to operate as an outbound system, i.e., without a human user present at the server. Testing systems and equipment are discussed in U.S. Pat. No. 7,460,983, the contents of which are incorporated by reference in their entirety.

Viewing inbound recording screen as shown in FIG. 7, a user operates a system of the invention to receive over a communication line an analog signal, sample the analog signal, and measure a quality of a component of the signal having a known frequency. Generally, in a basic test mode, a signal will include a number of components having a known frequency, such as two or three. As shown in FIG. 7, a system is provided that expects to receive a 600 Hz signal, a 1800 Hz signal, and a 3000 Hz signal.

Inbound computer 125 records or saves these digital copies of the waveforms and measures their qualities. By measuring the quality of the signal received across a number of wavelengths, the system gives a measure of the quality of the communication line across a bandwidth. Any number of components of known frequency may be received, and preferably they will span at least about 1000 Hz of bandwidth, e.g., at least about 2000 Hz. In certain embodiments, at least one frequency is below about 1000 Hz (e.g., about 600 Hz) and at least one is about 2500 Hz (e.g., 3000 Hz). The plurality of known frequencies may include a frequency between about 500 Hz and about 700 Hz, one between about 1000 Hz and about 1500 Hz, and optionally at least one more above, below, within one of, or between those ranges. Any set of frequencies may be used. Generally, a frequency is known in that it is specified by at least either input of a user operator (e.g., at the outbound system) or computer program instructions. For example, a user of a system of the invention may not know the frequency if known refers to the frequency having been specified by instructions in the computer program. An outbound or inbound user may not see or "know" the value of the frequency for example, in embodiments of the invention in which a very simple, user-friendly interface is provided. In some embodiments, frequencies are not known, for example, by the inbound user or by any program instructions in the inbound system. The system samples an inbound analog signal and optionally measures the frequency of components of the signal. Thus, the invention provides systems, methods, and devices for receiving an analog signal the includes a component having a frequency and sampling the signal and measuring a quality of it. A user may not know the frequency, either prior to using the system or ever, and the frequency may not be specified within the computer code in the system, for example, prior to operation.

Processor 281 on the inbound system can operate to measure a quality such as frequency, power, jitter, signal-to-noise (SNR, in dB), or signal to noise and distortion (SINAD). In certain embodiments, the inbound system samples the analog signal and stores a digital copy of the signal in memory 277. Inbound computer 125 then sends the digital copy to another computer (e.g., as an email attachment; using a file transfer protocol (FTP); via a secure file transfer protocol (SFTP); through operation of an scp command—for example, in a cron table; or similar means) where a quality of the signal is measured. While the signal that is sent to, and received by, the inbound computer is an analog signal (i.e., for testing the quality of the communication line for communication via electronic pulses), transfer of a digital copy of the file can be by any means. For example, the digital file can be sent as packets according to a transmission control protocol (TCP) or a user datagram protocol. The digital file may be sent via the communication line being tested, or may be sent using an independent channel. To illustrate, in some embodiments, an analog signal is received through phone line 133 into a phone jack 115 on device 117, as shown in FIG. 1, and a digital copy of the sampled analog signal is sent as an email attachment or via FTP over a local Wi-Fi network through the use of a Wi-Fi card on computer 125 after which the digital copy may be forwarded back to the outbound computer, to a server computer, or to another device. Accordingly, in certain embodiments, measurements are performed within the inbound system (i.e., by processor 281 on inbound computer 125) while in some embodiments, a quality of a known frequency in the sample signal is measured by a remote processor in a computer that is independent from inbound computer 125 (e.g., a server computer or the outbound computer, where here, "remote" is used simply to specific that the processor is not the processor of computer 125) and the remote processor is in communication with the sampler via the mediating influence of a communication line, the computer 125, or a combination thereof. Secure communication is discussed in U.S. Pub. 2011/0135093; U.S. Pub. 2007/0177578; U.S. Pub. 2005/0058122; and U.S. Pub. 2002/0051463, the contents of each of which are hereby incorporated by reference in their entirety for all purposes.

In certain aspects, systems and methods of the invention offer an extended test that includes a greater number of known frequencies in an analog signal for testing a communication line and providing more information that is provided by a basic test.

An extended test according to certain embodiments of the invention includes sending or receiving an analog signal that has a number of components of known frequencies such as, for example, 8, 9, 10, 11, or 12 different known frequencies. Generally, at least three known frequencies will be included in an extended test, preferably about five or more.

When a user of a computer 125 chooses the "Comm Test Extended" button from the main menu (FIG. 4), they will be taken to the extended test parameters screen shown in FIG. 8. Operation of the extended test involves substantially similar steps and functions as the basic test, as described above. However, an extended test will generally involve a signal that includes more components in the analog signal than with a basic test.

The extended test tool is useful in identification of circuits and their respective components that perform at the minimal margins of acceptability or do not meet the minimum performance characteristics. There are instances where the communications channel allows normal voice communications but prevents successful secure communications. This phenomenon can occur, for example, when the traditional measure of circuit quality, the signal to noise ratio, is well within accepted tolerances. To achieve the necessary data rates within the limited bandwidth of a telephone switched circuit devices, systems use a phase modulation scheme. To identify sources of problems when the end-user can talk "in the clear" but cannot use the telephone to "go secure," methods and systems of the invention provide a quality measurement such as phase, jitter, and distortion and can use a plurality of audio tones (e.g., 10) to sweep the entire audio bandwidth of the selected channel.

Information about the received signal as shown in FIGS. 9-12 are provided for troubleshooting and maintenance of communication network components. With this information, technical personnel can pin point sources of trouble and affect repairs keeping system downtime to a minimum. In certain embodiments, a ten-tone method takes just over 30 seconds to run.

After running the receiving and recording steps, a user may return to a parameter screen such as, for example, one of the ones shown in FIGS. 5 and 8, and edit or update parameter information. Some fields will pre-populate based on the entries of previous fields. Field descriptions may appear associated with the fields. In some embodiments, it is not required to enter the information to run a test.

Figure 9:
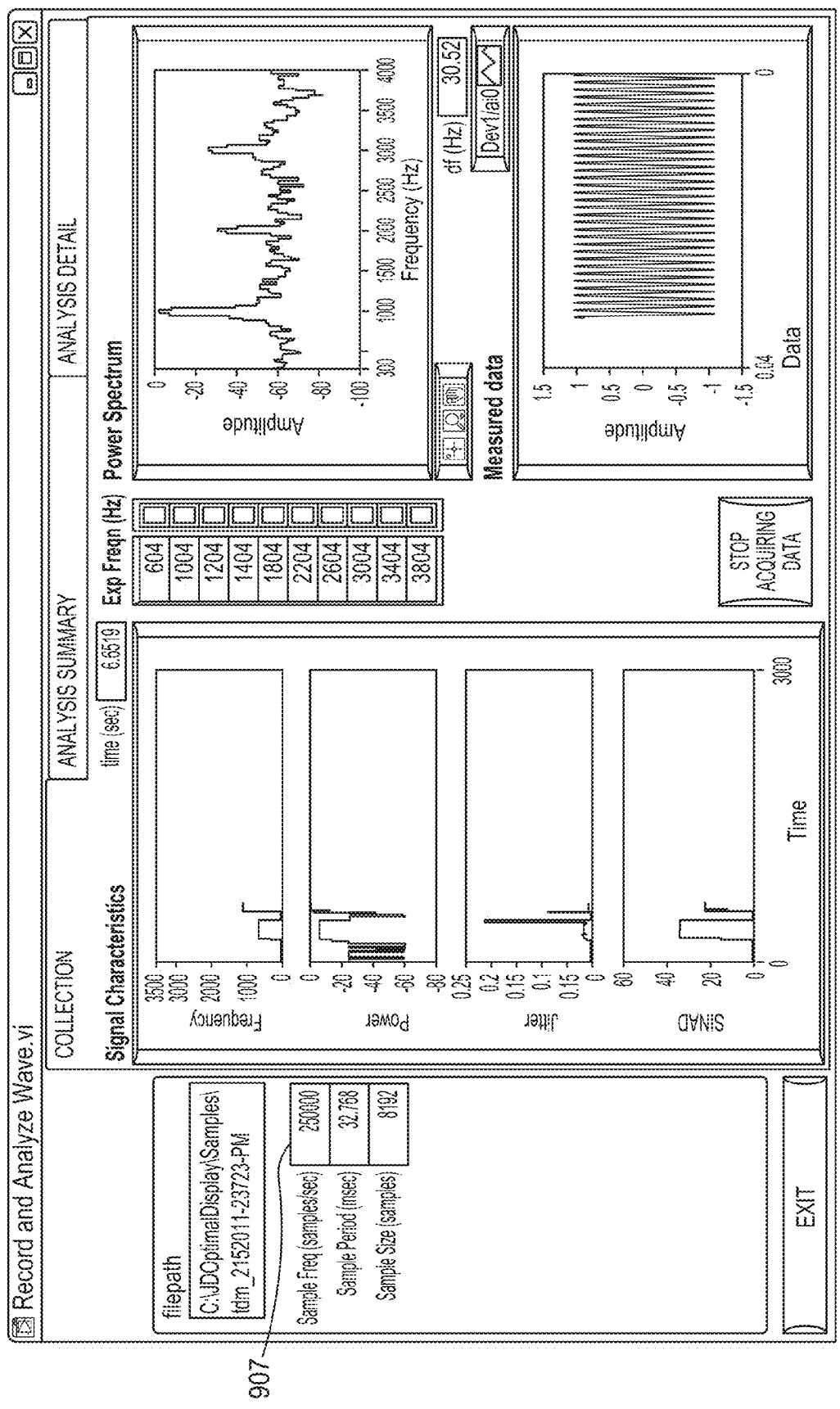
FIG. 9 is a screen shown during receipt and recording of signal.

FIG. 9 is a screen shown during receipt and recording of signal in an extended test. As can be seen, aspects of the incoming signal to be measured can include peak frequency, noise, jitter, and SINAD. As shown in FIG. 9, an extended test can involve receiving a signal that includes ten expected frequencies (e.g., here, 604 Hz, 1004 Hz, 1204 Hz, 1404 Hz, 1804 Hz, 2204 Hz, 2604 Hz, 3004 Hz, 3404 Hz, and 3804 Hz—also shown in FIG. 10). Receiving and sampling the signal can include measuring a power spectrum across frequencies or measuring an amplitude or waveform of an incoming signal. Other tones, frequencies, durations, or intervals, or combinations thereof, may be used.

In certain embodiments, a user will view the record signal screen shown in FIG. 9 while communicating with a sender via a coordination call. When the sending system is done sending, the receiving user will hit the "Stop Acquiring Data" button (FIG. 9). In some embodiments, starting, stopping, or other steps are automated, synchronized, or under external control. For example, in certain embodiments, the analog signal that is sent by the outbound system includes a control tone or code that signals to the receiving system to do something. For example, an certain tone can trigger the receiving computer to stop acquiring data.

Figure 10:
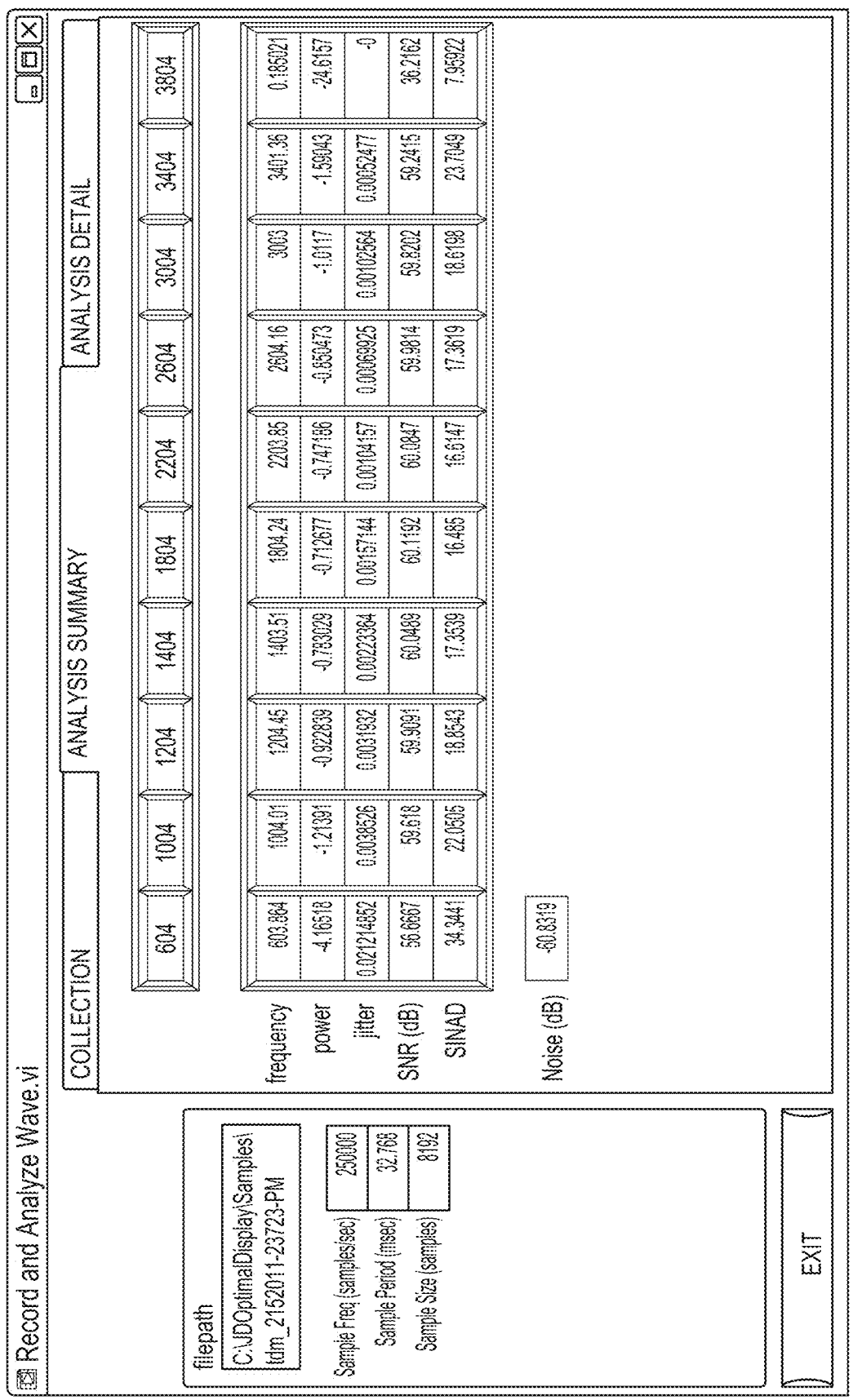
FIG. 10 shows a screen giving a summary of measurements of qualities of a signal.
Figure 11:
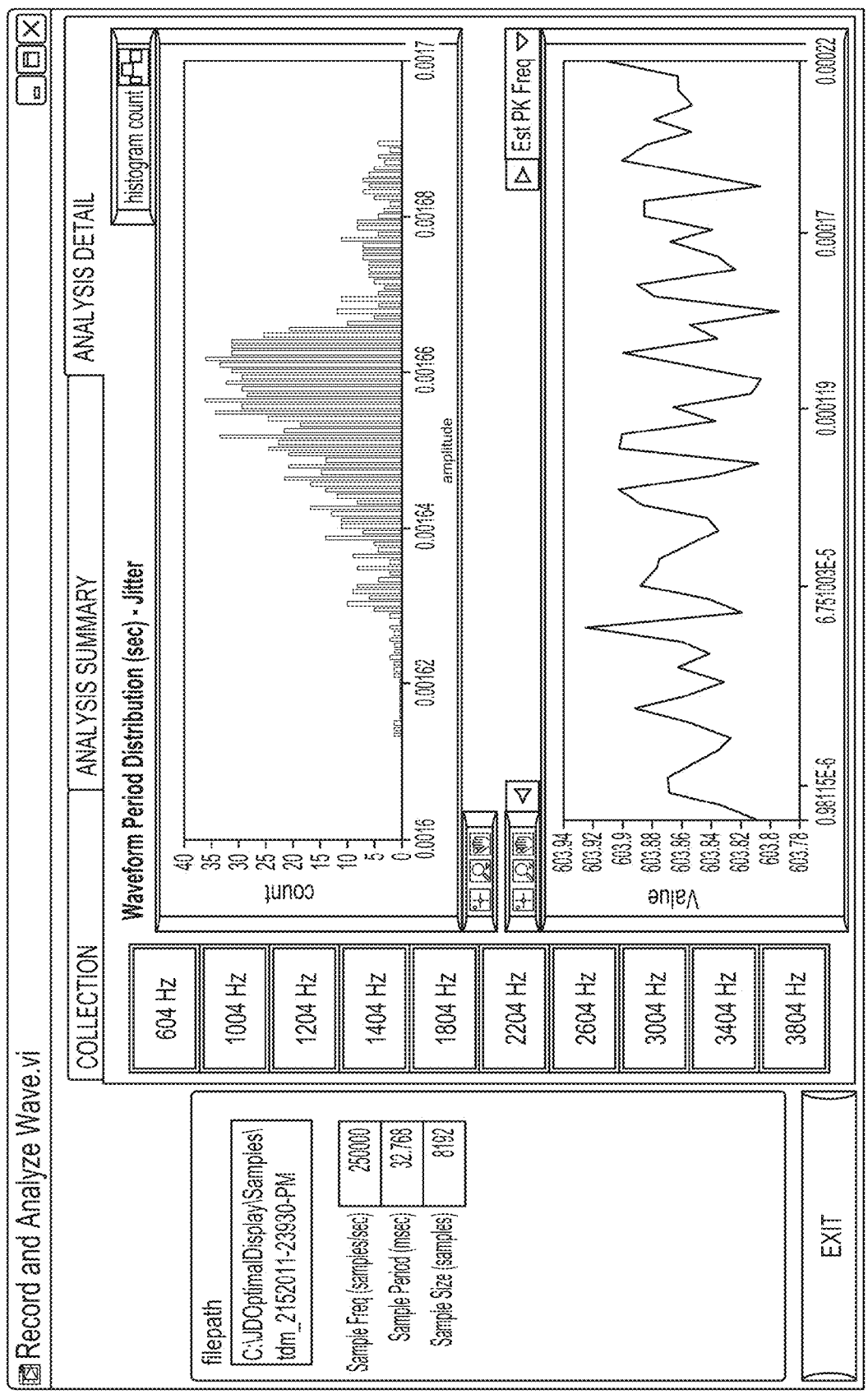
FIG. 11 is a screen showing detailed measurements of qualities of a received signal.
Figure 12:
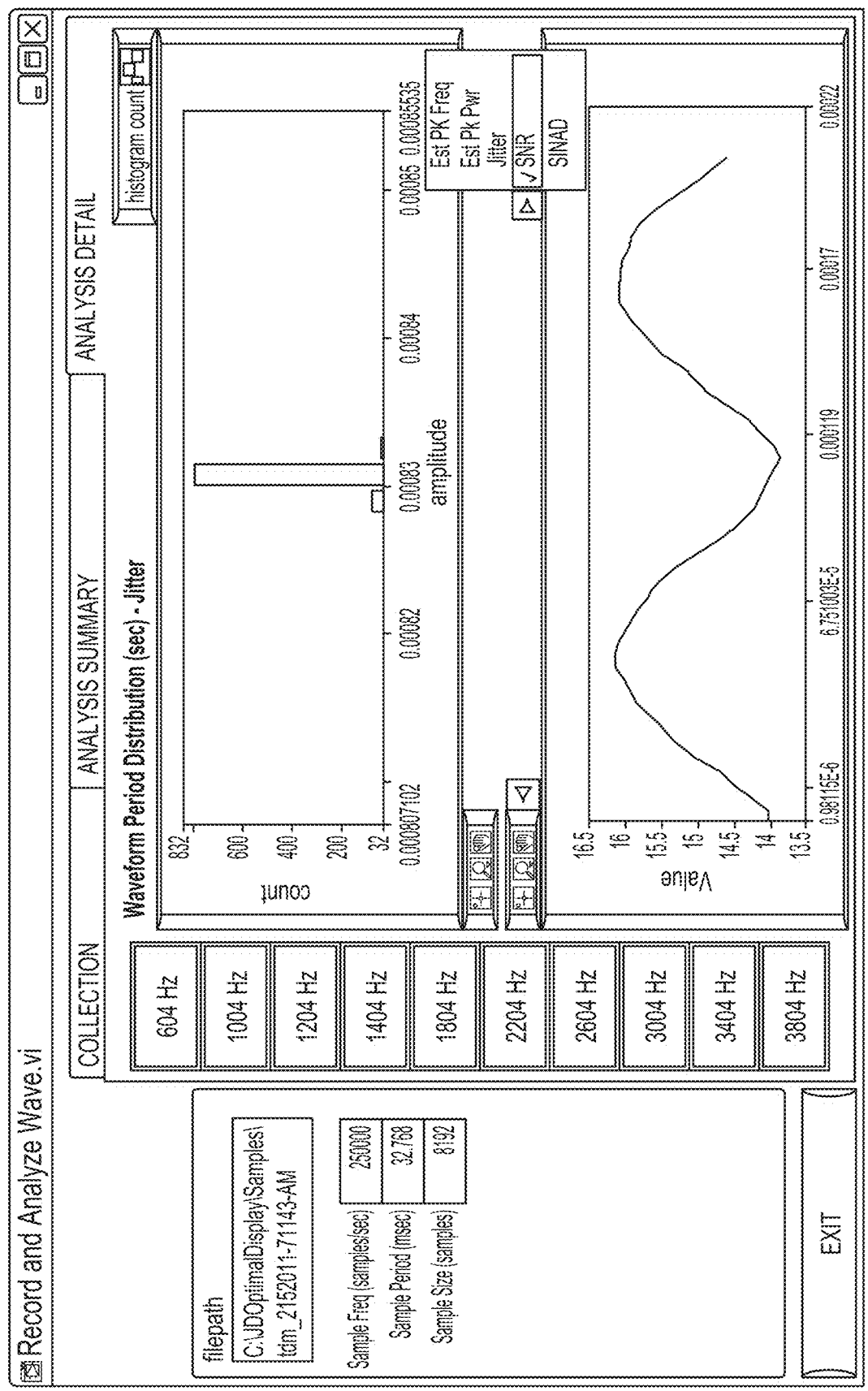
FIG. 12 shows an interface being used to see a signal-to-noise ratio measurement of a 1204 Hz frequency wave in a received signal.

FIG. 10 shows a screen giving a summary of measurements of qualities of a received signal that may be shown after or during receiving the analog signal. FIG. 11 is a screen showing detailed measurements of qualities of a received signal. FIG. 12 shows an interface being used to see a signal-to-noise ratio measurement of a 1204 Hz frequency wave in a received signal.

Referring to FIG. 9, the inbound tester can monitor the testing process using the record and analyze screen. The tester has immediate feedback graphically indicating signal to noise ratios, jitter, signal strength, and SINAD (signal to noise with distortion). In some embodiments, device 117 samples the incoming signal at a sampling rate greater than 100 KHz, e.g., 250 KHz. The received files can become very large.

After stopping recording, in certain embodiments, the system performs analysis, calculates the values from the recorded signals, and presents the information in an easy to read tables. A table can be shown as in FIG. 10 that is color coded, labeled, tagged, marked, or shaded to provide immediate feedback to the tester for any parameter that is within or outside of accepted tolerances.

The analysis summary can be shown on screen as in FIG. 10. The parameters in this screen may be differentially shaded for illustrative purposes. For a more comprehensive view of any given parameter, the tester may select the Analysis Detail tab or double-click on any one of the items in the table. An exemplary analysis detail tab is shown in FIGS. 11-12.

The module can display the details with respect to the recorded 604 Hz test tone (shown in the Analysis Detail, FIG. 11). Systems of the invention can include any useful GUI elements such as icons that allow pan and zoom of the information or waveforms. Using the icons allows detailed analysis of the received signal. Analysis can be narrowed down to a precise moment in time or used to highlight a particular anomaly. Systems of the invention may present detailed information on any test frequency or resultant calculated parameter. Clicking on any calculated parameter on the "Analysis Summary" page can bring up the details of the collected signal. When the inbound tester selects the exit box, the system may bring up the information screen (e.g., one of the ones shown in FIGS. 5 and 8) for any post-testing notes the inbound tester may want to include.

The tool can send the information to a database in memory 277 and can advance the test increment counter by one.

In certain embodiments, after the stop button is pressed, the application will calculate the Signal to Noise and Jitter for each of the tones on that run (actual time may be determined by load on the machine and the size of the file captured).

In some embodiments, a device of the invention can receive a criterion and compare an aspect of the measured signal to the criterion to evaluate the tested communication line. For example, where a high signal-to-noise measurement is desired, a criterion of about 40 or about 50 can be established, and the application can report a positive result if the threshold is met or exceeded. Where a low jitter is desired, a threshold can be established (e.g., 0.0001) and a test can evaluate if the threshold is met. Adjustment of the tolerances is easy and normally left to dedicated expert personnel. (E.g. The previously accepted limit for signal to noise may have been 35 dB. The supervisory personnel want the new minimum standard to be 45 dB. Where a signal to noise calculation of 40 dB would be "green" acceptable, with the new accepted level of 45 dB, this parameter will have a red flag.) The process is simple and far end testing personnel can make on-scene adjustments facilitated by other personnel talking them through the parameter changes.

The database can store an electronic copy of the waveform and calculated parameters. The advantage of keeping all of the calculated information and signals is in post-testing analysis. The stored waveforms can later be used or analyzed repeatedly with new algorithms if necessary or desired to further identify sources of problems. Stored waveforms can be used at a receiving system, sending system, or other computer (e.g., server, terminal, or another independent computer) while running a test or later for generating, viewing, sending, or saving reports.

Figure 13:
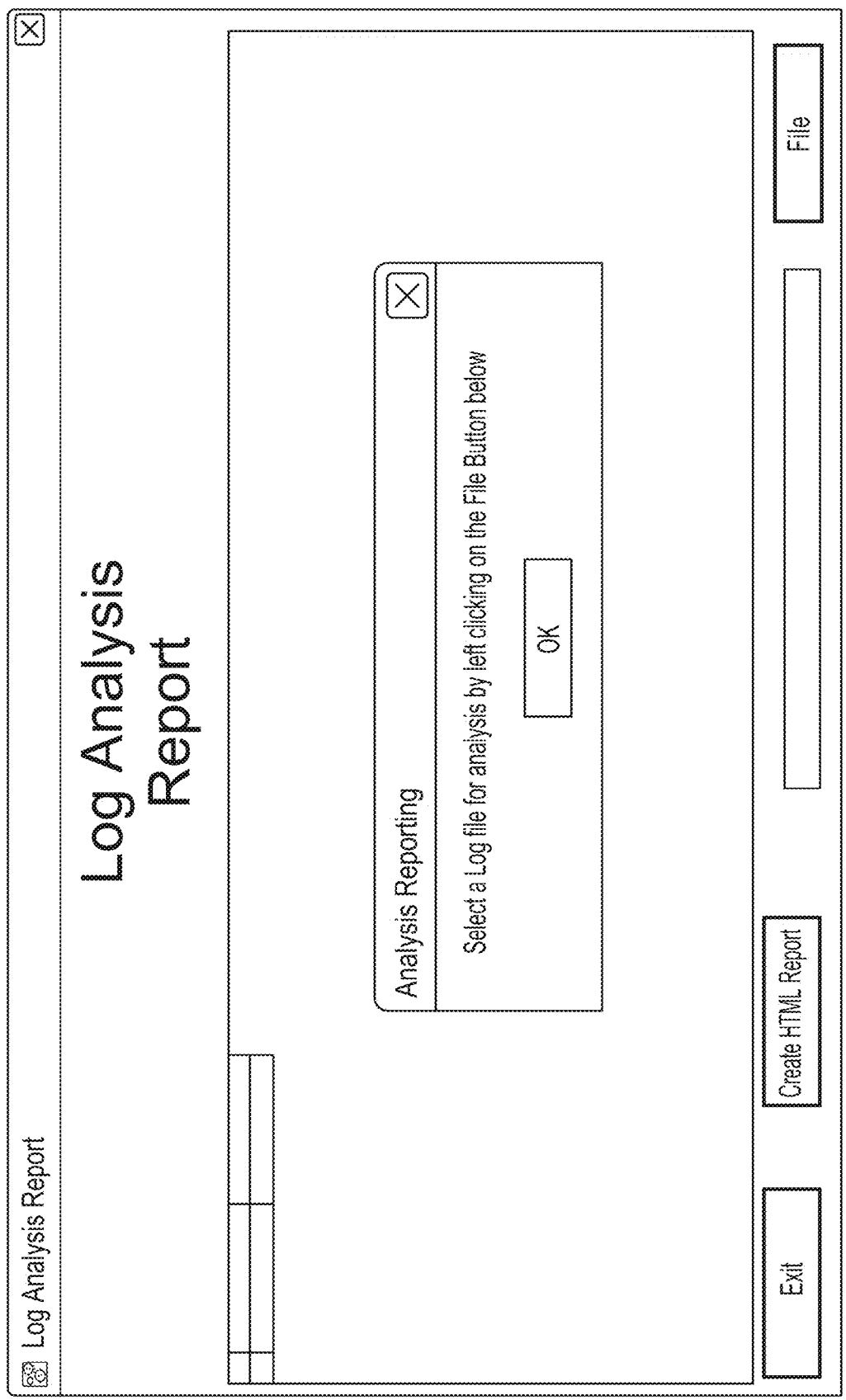
FIG. 13 shows a screen for starting a report including provided measurements.

FIG. 13 shows a screen for starting a report including provided measurements. In some embodiments, systems of the invention include a report module. A report module can open into the Log Analysis Report page (FIG. 13), where a user can click the "File" Button in the lower left hand corner to select and open a log file. The select box may open to the directory of collected log files. The log files names can use a timestamp to make it easier to identify which file to report on based on the original creation date and time of the file.

FIG. 14 shows a screen listing records of sent and received signals. A user may identify the desired log file and select it. The file will open in grid view so that the user can see all of the information that was collected. In some embodiments, there is a scroll bar on the side and bottom to facilitate large data sets, and a user may use these if the desired field is not immediately visible. These fields match back to the qualities tested during receiving and each column links to a particular data field that was collected during the test. Each row represents 1 test. Since each test involved an inbound piece and an outbound piece, there may be blanks in the Signal to Noise and Jitter Analysis fields for those test runs where a system was in "outbound" mode. This is because outbound mode can send the preset tone signal without recording.

A user may create a report for analysis or sharing of the data by pressing a button such as a "Create HTML Report" button. A pop-up may report the creation of the report and the report will automatically open (e.g. in a computer application such as, for example, Internet Explorer, a word processor, or a dedicated app) for viewing. In certain embodiments, the report is in HTML or another format, such as HTML5 or XML.

In some embodiments, the report is broken up into several sections as shown in FIG. 15. The first section, "Log Analysis" provides a good overview of the other three sections so that this report can stand on its own and be used for after action reviews, shared with various interested parties by itself, or as a part of a larger report.

FIG. 16 shows a report provided by the invention that includes measurements of qualities of signals comprising three known frequencies received according to methods and devices of the invention. The exemplary "Log Analysis Summary Page" shown in FIG. 16 can display the results of a number of simple metrics performed on the data and give an overview of the work that went into this report and the overall success rates of the data collection for that test run.

FIG. 17 shows a detailed report provided by methods and devices invention that includes measurements of qualities of signals comprising three known frequencies received according to methods and devices of the invention. The "Log Detail Page" shown in FIG. 17 can provide details similar to the grid view for deeper analysis and inclusion in further reports. This section can split out the comments (designated by an asterisk) for improved formatting and printability.

FIG. 18 shows a log notes page according to the invention. The exemplary "Log Notes Page" shown in FIG. 18 can contain the comments (e.g., linked to the "Log Detail Page" above) in an easy to read and print format. To view them all together, a grid view may be provided, or the contents can be sent to one or more CSV files directly using Excel or a similar tool.

Figure 19:
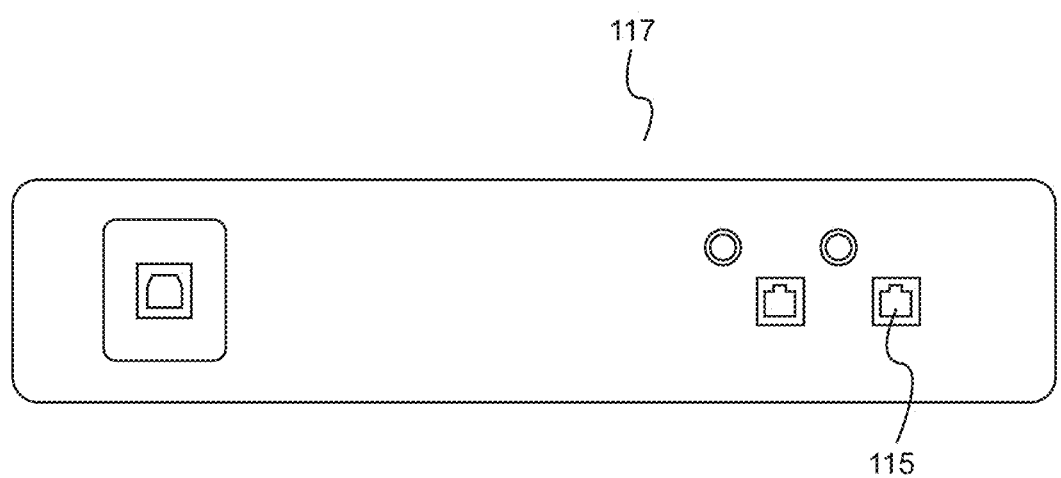
FIG. 19 shows a device according to certain embodiments of the invention.

In certain aspects, the invention provides a device for testing a communication line such as is shown in FIG. 19. The devices shown in FIG. 19 can be coupled to computer 125, which includes a memory coupled to a processor that can execute instructions that cause the processor to receive an incoming digital signal from an analog to digital converter device 117, as shown in FIG. 19. Computer device 125 can then save the incoming digital signal to memory, measure a quality of the signal (e.g., noise, strength, signal-to-noise, SINAD, frequency, or jitter), and provide information about a quality of the signal. FIG. 19 shows an embodiment of a device of the invention that can be linked via USB to a laptop computer (e.g., a PC-compatible computer such as a Dell Latitude E6520 PC laptop available from Dell Inc. (Round Rock, Tex.)). In one embodiment the laptop is capable of running an operating system. In one embodiment, that operating system is Windows 7 or Windows XP. In one embodiment, the operating system has been configured according to the Standard Technical Implementation Guidelines (STIGs) for Department of Defense systems, the contents of which are incorporated herein by reference in their entirety (see, for example, Windows 7 Security Technical Implementation Guide, Version 1, Release 8, dated Apr. 27, 2012, available as a downloadable PDF file from the Security Technical Implementation Guides (STIGs) page of the Information Assurance Support Environment web page maintained within the web site of the Defense Information Systems Agency (DISA) (Fort Meade, Md.) of the United States Department of Defense).

Figure 20:
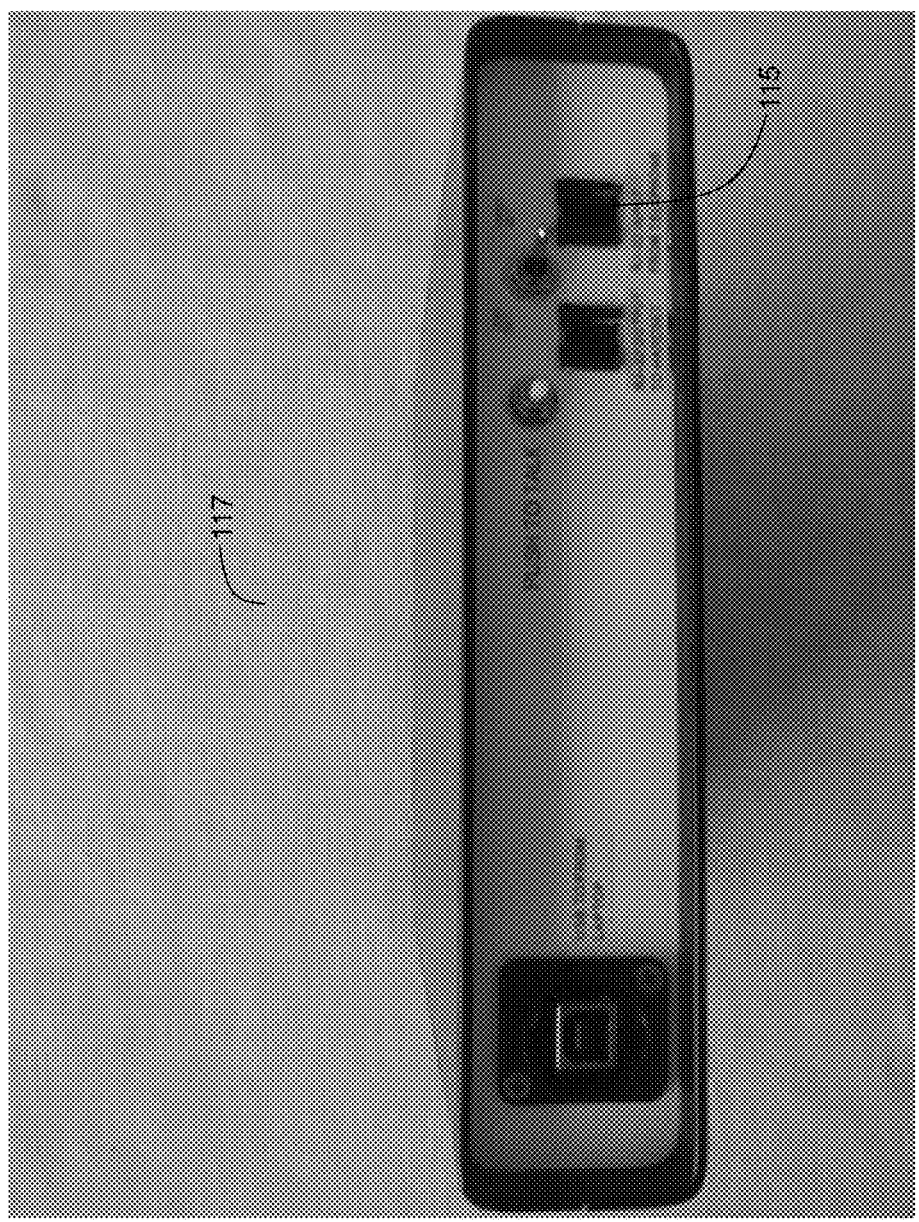
FIG. 20 is a photo of the device in FIG. 19.

FIG. 20 is a reproduction of a photo of the device shown in FIG. 19.

In one embodiment, the invention comprises a module or a client and a remote computer or a server. The module can be configured to be connected to a network via a network interface point. The module can be configured to be connected to the remote computer. The remote computer may comprise software which performs at least one step of the invention. An aspect or step of the invention which may happen on the remote computer can include, but is not limited to: signal generation; recording; analysis; saving data to a log file; conversion between analog and digital; collecting and saving information. In this embodiment, a user may interact with the software on the remote computer through a web-browser, a custom application, a command-line interface or other means. In one embodiment, only a portion of the steps of the invention takes place on the remote computer. In one embodiment, any of the steps of the invention may take place on the module or client.

In some embodiments, a module of the invention comprises or consists of a cell phone, smart-phone, iPhone, iPad, PDA, other portable device, handheld device, or similar device.

One or more step of the invention may be performed automatically, or may be scheduled to be performed ahead of time. Software on a computer or server can run and perform a step of the invention automatically. For example, software in a module runs and causes software on a server to run. In one embodiment, a module can both send and receive simultaneously, for instance, through a "looped" communication line, or by employing two network interface points on a single module or device. Each of the modules can use a combination of hardware and software that can be customized for a physical operating environment as well as software that can be optimized to mission goals and objectives.

The invention provides systems and methods that present a simplified user experience and provide complex capabilities to people who are not experts such as telecommunications engineers, or in other similarly complex and necessarily detailed field of study A module of the invention can contain deep knowledge of a network or component. A module of the invention can make decisions on the information that is derived by operating the module by encapsulating basic rules simulating that subject matter expert. A module of the invention can provide a complex policy engine that can extend the organizational policy to a distant and temporary network or component by deploying those policies through a policy model. A module of the invention can supply knowledge and provide guidance for a layman that would otherwise require a subject matter expert. A module of the invention can enable an operator to extend his knowledge into the field of the subject matter expert and complete his mission as if he had the benefit of a subject matter expert beside him.

In order to provide to non-experts the ability to test a communication line and identify defects, make a determination of a suitability for secure operation, or establish an available bandwidth or capacity, the invention provides a simplified user experience that provides meaning that is visually obvious to a complex security landscape by applying a configurable policy to the events generated by the industry leading modules for security and testing that have been installed into the unit. In some embodiments, systems and methods of the invention are simple enough for a non-expert to use. Secure communication is discussed in U.S. Pat. No. 7,188,180; U.S. Pat. No. 6,839,759; and U.S. Pub. 2007/0177578, the contents of each of which are incorporated by reference herein in their entirety for all purposes. By not being too complicated for a lay-person to use, a module of the invention can avoid its being misused or not used at all. As a result, security breaches are avoided where, otherwise, users may not establish that a line is capable of going secure yet use that line for intended secure operation nonetheless, allowing important secured information to be compromised.

Systems and methods of the invention may generally be implemented through the use of one or more of computer 125. Computer 125 generally includes a processor 281 operably coupled to a memory 277 and configured to send or receive information via input-output device 285.

One of skill in the art will recognize that processor 281 may be provided by one or more processors including, for example, one or more of a single core or multi-core processor (e.g., AMD Phenom II X2, Intel Core Duo, AMD Phenom II X4, Intel Core i5, Intel Core i& Extreme Edition 980x, or Intel Xeon E7-2820). In certain embodiments, computer 125 may be a tablet or smart-phone form factor device and processor 281 can be provided by, for example, an ARM-based system-on-a-chip (SoC) processor such as the 1.2 GHz dual-core Exynos SoC processor from Samsung Electronics, (Samsung Town, Seoul, South Korea).

Input-output device 285 generally includes one or a combination of monitor, keyboard, mouse, data jack (e.g., Ethernet port, modem jack, HDMI port, mini-HDMI port, USB port), Wi-Fi card, touchscreen (e.g., CRT, LCD, LED, AMOLED, Super AMOLED), pointing device, trackpad, microphone, speaker, light (e.g., LED), or light/image projection device.

Memory 277 generally refers to one or more storage devices for storing data or carrying information, e.g., semiconductor, magnetic, magneto-optical disks, or optical disks. Information carriers for memory 277 suitable for embodying computer program instructions and data include any suitable form of memory that is tangible, non-transitory, non-volatile, or a combination thereof. In certain embodiments, a device of the invention includes a tangible, non-transitory computer readable medium for memory 277. Exemplary devices for use as memory 277 include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); magneto-optical disks; and optical disks (e.g., CD and DVD disks). The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., computer 125 having a graphical user interface or a web browser through which a user can interact with an implementation of the subject matter described herein), or any combination of such back-end, middleware, and front-end components. The components of the system can be interconnected through network 249 by any form or medium of digital data communication, e.g., a communication network. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Visual Basic, or JavaScript. In certain embodiments, systems and methods of the invention are implemented through the use of a mobile app. As used herein, mobile app generally refers to a standalone program capable of being installed or run on a smartphone platform such as Android, iOS, Blackberry OS, Windows 8, Windows Mobile, etc. For example, in certain embodiments, DAC 269 is provided by a mobile app such as OsciPrime Oscilloscope by Nexus-Computing (Baden, CH) or Oscilloscope Pro by NFX Development, available for Android operating systems from the Google play app store from Google (Mountain View, Calif.). A mobile app can also include sampler or DAC functionality developed in an integrated fashion with mobile app program instructions that operate to perform a test in inbound or outbound mode. For example, in certain embodiments, a system operating in outbound mode is provided by a smartphone or tablet, either connected to a telephone, or using an internet connection with, for example, a VoIP. The outbound device sends an analog signal including a component having a known frequency. Additionally or alternatively, in some embodiments an inbound system is provided by a smartphone or tablet, for example, by a mobile app that receives an analog signal, samples it, and measures a quality of a component of known frequency. Functionality of the invention can be implemented by a mobile app or a software application or computer program in other formats included scripts, shell scripts, and functional modules created in development environments.

A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over network 249

(e.g., as packets being sent between a server and a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file can be invoked manually or automatically by a program or by a save command from software or a write command from a programming language.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for testing a communication line, comprising:
a jack for connection to a communication line;
a sampler coupled to the jack;
a processor in communication with the sampler; and
a non-transitory memory coupled to the processor, wherein the system is operable to perform a pre-defined inbound basic test and a pre-defined inbound extended test,
wherein the inbound basic test comprises:
receiving at least three known frequencies defining a bandwidth greater than about 2000 Hz sent sequentially by a second system substantially similar to the system;
sampling each of the three known frequencies in sequence as they arrive;
storing the three known sampled frequencies in the non-transitory memory; and
measuring a quality of each of the three known frequencies,
and wherein the inbound extended test comprises:
receiving at least five known frequencies, at least one of which is below 1000 Hz and at least one of which is above 3000 Hz, the at least five known frequencies sent sequentially by the second system;
sampling each of the five known frequencies;
storing the five known sampled frequencies in the non-transitory memory;
measuring a quality of each of the five known frequencies; and
determining that the communication line cannot operate in a secure mode.

2. The system of claim 1, wherein the jack receives signals via a phone cord plugged into the base unit of a telephone.

3. The system of claim 1, wherein the system is operable to perform an outbound basic test and an outbound extended test by
executing, using the processor, instructions that cause the processor to issue a digital signal and send the digital signal to the sampler;
converting, using the sampler, the digital signal into an analog signal comprising a plurality of known frequencies; and
sending the plurality of known frequencies separately and in sequence through the communication line, wherein the plurality is at least three for the basic test and at least five for the extended test.

4. The system of claim 1, wherein the sampler comprises a digital storage oscilloscope.

5. The system of claim 4, wherein the data connection comprises a USB connection, the jack comprises a 4P4C connector, and the sampler further comprises a handset jack for connection to a handset of a telephone.

6. The system of claim 1, wherein the measured quality comprises noise and jitter of the known sampled frequencies.

7. The system of claim 1, wherein receiving the five known frequencies comprises receiving at least five megabytes per second for at least five seconds.

8. A method for testing a communication line, comprising:
using an apparatus to perform an inbound basic line test, an outbound basic line test, an inbound extended line test, and an outbound extended line test, the apparatus comprising a sampler coupled to a jack for connection to a communication line and a processor coupled to a non-transitory memory and in communication with the sampler, wherein:
the inbound basic line test comprises sequentially receiving an analog signal comprising at least three known frequencies spanning about 2000 Hz through a communication line, sampling the three known frequencies, and storing the sampled frequencies in the non-transitory memory;
the outbound basic line test comprises sending the three known frequencies through the communication line one after another;
the inbound extended line test comprises sequentially receiving and sampling at least five frequencies spanning about 2000 Hz and storing the sampled five frequencies in the non-transitory memory, measuring a quality of the sampled five frequencies, storing a measurement of the quality of the sampled five frequencies, providing the measurement to a user, and determining a suitability of the communication line for secure operation; and
the outbound extended line test comprises sending the at least five known frequencies one after another.

9. The method of claim 8, wherein the measuring is performed on a digital copy of the sampled five frequencies after the five sampled frequencies have been stored in the non-transitory memory.

10. The method of claim 9, wherein the frequencies are sampled at a sampling rate between about 100 KHz and about 1000 KHz.

11. The method of claim 8, wherein the analog signal is received from a telephone base unit.

12. The method of claim 8, further wherein the inbound basic line test and the inbound extended line test each comprise receiving at least two megabytes per second for at least two seconds.

13. The method of claim 8, wherein at least one of the five frequencies is below 1000 Hz and at least one of the five frequencies is above 3000 Hz.

14. The method of claim 8, wherein the three known frequencies comprise a frequency between about 500 Hz and about 700 Hz.

15. The method of claim 8, wherein measuring the quality comprises measuring noise and jitter.

16. The method of claim 8, further wherein the outbound basic line test comprises sending the three known frequencies through the communication line one after another as analog signals and the outbound extended line test comprises sending the at least five known frequencies one after another as analog signals through the communication line.

* * * * *